US012684456B2

(12) United States Patent
Zhang

(10) Patent No.: US 12,684,456 B2
(45) Date of Patent: Jul. 14, 2026

(54) ROUTE INFORMATION UPDATE METHOD, COMMUNICATION APPARATUS, AND STORAGE MEDIUM

(71) Applicant: HUAWEI TECHNOLOGIES CO., LTD., Shenzhen (CN)

(72) Inventor: Bo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 18/192,866

(22) Filed: Mar. 30, 2023

(65) Prior Publication Data

US 2023/0262579 A1     Aug. 17, 2023

Related U.S. Application Data

(63) Continuation of application No. PCT/CN2021/108264, filed on Jul. 23, 2021.

(30) Foreign Application Priority Data

Sep. 30, 2020    (CN) .......................... 202011066067.7

(51) Int. Cl.
*H04W 40/24*        (2009.01)

(52) U.S. Cl.
CPC .................................. *H04W 40/248* (2013.01)

(58) Field of Classification Search
CPC .............................. H04W 40/248; H04L 45/66
See application file for complete search history.

(56) References Cited

U.S. PATENT DOCUMENTS

| | | | | |
|---|---|---|---|---|
| 2016/0286590 A1* | 9/2016 | Cheng | ..................... | H04W 4/02 |
| 2021/0400759 A1* | 12/2021 | Kuo | ....................... | H04W 76/25 |
| 2022/0007445 A1* | 1/2022 | Pan | ........................ | H04W 76/15 |
| 2023/0061284 A1* | 3/2023 | Perras | ................... | H04W 4/023 |

FOREIGN PATENT DOCUMENTS

| | | |
|---|---|---|
| CN | 107547335 A | 1/2018 |
| CN | 109150713 A | 1/2019 |
| EP | 3629658 A1 | 4/2020 |
| WO | 2017106705 A2 | 6/2017 |
| WO | 2019231818 A1 | 12/2019 |

OTHER PUBLICATIONS

Extended European Search Report issued in corresponding European Application No. 21873998.5, dated Dec. 21, 2023, pp. 1-11.

* cited by examiner

*Primary Examiner* — Hashim S Bhatti
(74) *Attorney, Agent, or Firm* — HAUPTMAN HAM, LLP

(57)        ABSTRACT
A route information update method includes: A second terminal generates route information of a first terminal, where a relay function of the second terminal provides a communication service for the first terminal and a first device based on the route information of the first terminal, and the first device includes a third terminal and/or a network device. The second terminal updates the route information of the first terminal to generate updated route information of the first terminal. The second terminal sends a second message to the first terminal, where the second message includes the updated route information of the first terminal. When the first device includes the third terminal, the second terminal sends the updated route information of the first terminal to the third terminal.

16 Claims, 16 Drawing Sheets

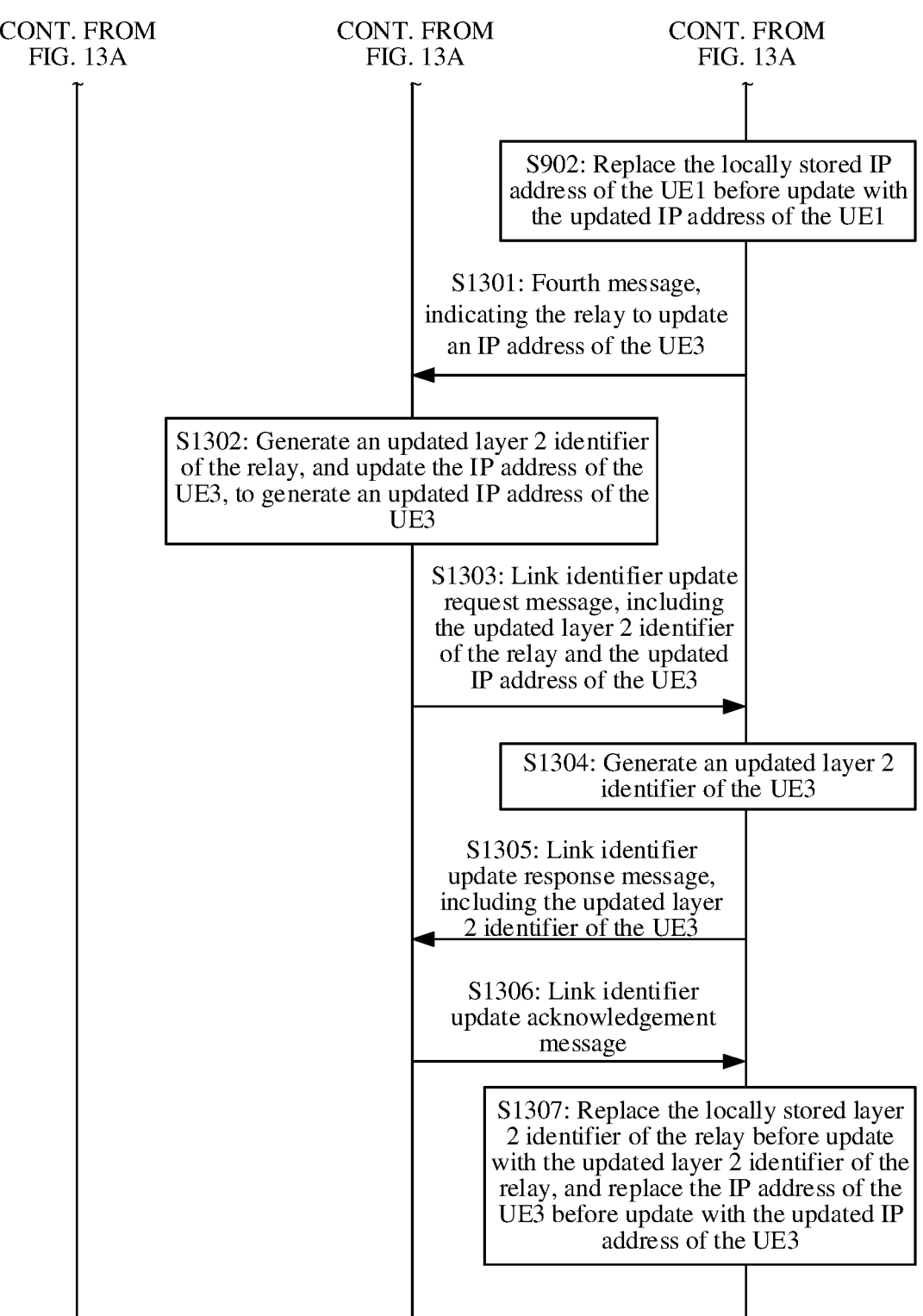

CONT. FROM FIG. 13A    CONT. FROM FIG. 13A    CONT. FROM FIG. 13A

S902: Replace the locally stored IP address of the UE1 before update with the updated IP address of the UE1

S1301: Fourth message, indicating the relay to update an IP address of the UE3

S1302: Generate an updated layer 2 identifier of the relay, and update the IP address of the UE3, to generate an updated IP address of the UE3

S1303: Link identifier update request message, including the updated layer 2 identifier of the relay and the updated IP address of the UE3

S1304: Generate an updated layer 2 identifier of the UE3

S1305: Link identifier update response message, including the updated layer 2 identifier of the UE3

S1306: Link identifier update acknowledgement message

S1307: Replace the locally stored layer 2 identifier of the relay before update with the updated layer 2 identifier of the relay, and replace the IP address of the UE3 before update with the updated IP address of the UE3

FIG. 13B

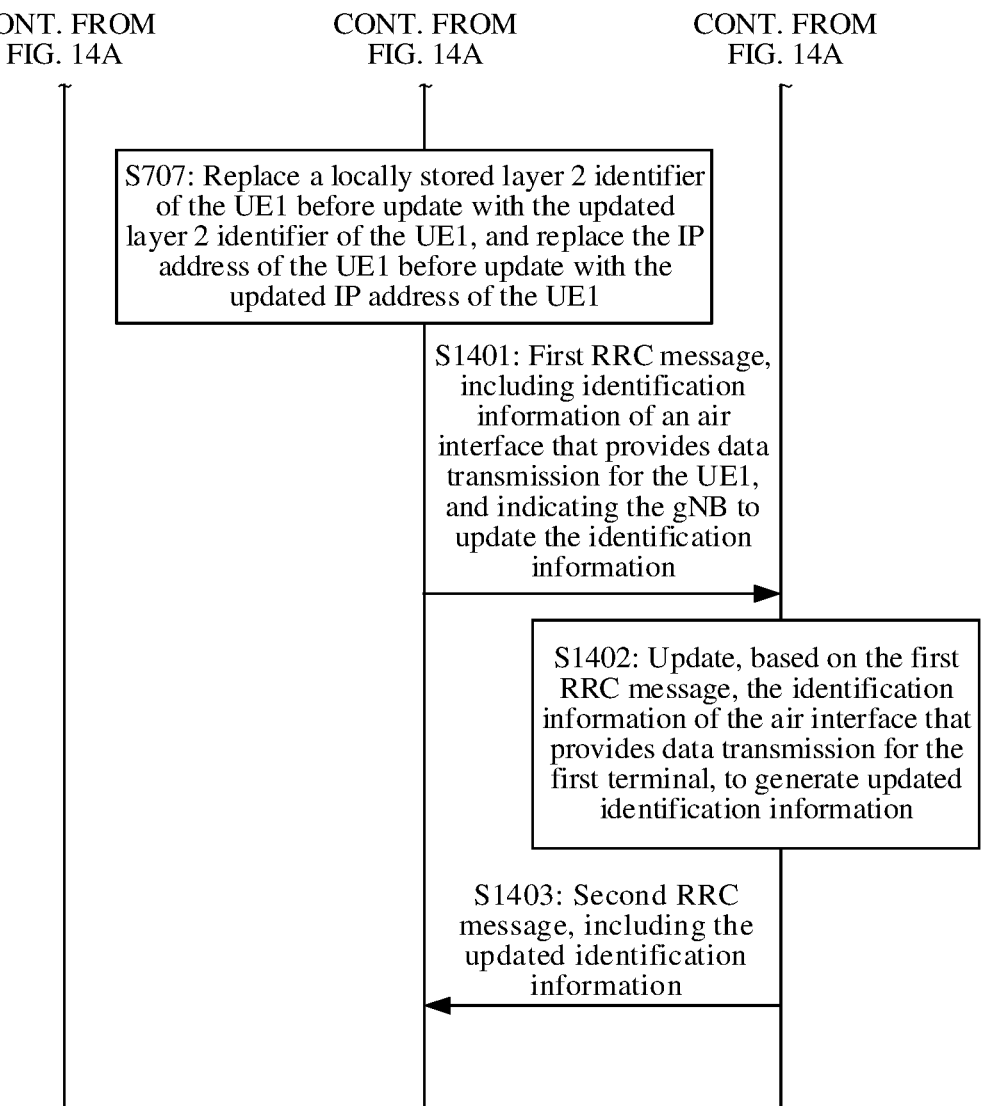

CONT. FROM
FIG. 14A

CONT. FROM
FIG. 14A

CONT. FROM
FIG. 14A

S707: Replace a locally stored layer 2 identifier
of the UE1 before update with the updated
layer 2 identifier of the UE1, and replace the IP
address of the UE1 before update with the
updated IP address of the UE1

S1401: First RRC message,
including identification
information of an air
interface that provides data
transmission for the UE1,
and indicating the gNB to
update the identification
information S1402: Update, based on the first
RRC message, the identification
information of the air interface that
provides data transmission for the
first terminal, to generate updated
identification information S1403: Second RRC
message, including the
updated identification
information

FIG. 14B

ROUTE INFORMATION UPDATE METHOD, COMMUNICATION APPARATUS, AND STORAGE MEDIUM

CROSS-REFERENCE TO RELATED APPLICATIONS

This application is a continuation of International Application No. PCT/CN2021/108264, filed on Jul. 23, 2021, which claims priority to Chinese Patent Application No. 202011066067.7, filed on Sep. 30, 2020. The disclosures of the aforementioned applications are hereby incorporated by reference in their entireties.

TECHNICAL FIELD

Embodiments of this application relate to the communication field, and in particular, to a route information update method, a communication apparatus, and a storage medium.

BACKGROUND

Short-distance service communication is also referred to as proximity service (proximity service) communication. In a short-distance service communication scenario, a terminal device (for example, a mobile phone) may communicate with a network (network) via another terminal device (for example, a mobile phone). For example, user equipment (user equipment, UE) 1 may communicate with a network via UE2, where the UE2 plays a role of a relay from the UE1 to the network (UE-to-network relay), so that a coverage capability of the network for the UE1 can be improved. In another short-distance service communication scenario, a terminal device may alternatively communicate with another terminal device via another terminal device. For example, UE1 may communicate with UE3 via UE2, where the UE2 plays a role of a relay from the UE1 to the UE3 (UE-to-UE relay), so that a communication distance between the UE1 and the UE3 can be increased.

The foregoing short-distance service communication scenario may also be referred to as a relay scenario. In the relay scenario, data transmission is performed between different UEs based on IP addresses of the UEs. However, currently, IP address update of UE in the relay scenario cannot be implemented.

SUMMARY

Embodiments of this application provide a route information update method, a communication apparatus, and a storage medium, to update route information of a terminal in a relay scenario.

According to a first aspect, an embodiment of this application provides a route information update method. The method includes: A second terminal generates route information of a first terminal, where a relay function of the second terminal provides a communication service for the first terminal and a first device based on the route information of the first terminal, and the first device includes a third terminal and/or a network device; the second terminal updates the route information of the first terminal, to generate updated route information of the first terminal; the second terminal sends a second message to the first terminal, where the second message includes the updated route information of the first terminal; and when the first device includes the third terminal, the second terminal sends the updated route information of the first terminal to the third terminal.

In the method, the second terminal may replace the stored route information of the first terminal before update with the updated route information of the first terminal. After receiving the second message, the first terminal may replace the route information of the first terminal before update with the updated route information of the first terminal. Subsequently, the first terminal may communicate with the first device based on the updated route information of the first terminal using the relay function of the second terminal.

The method is applicable to updating route information of UE in a relay scenario. In the method, the second terminal plays a role of a relay, and is configured to provide a communication service for the first terminal and the first device. The second terminal may distribute the route information of the first terminal for the first terminal, and update the route information of the first terminal.

In a possible design, after replacing the stored route information of the first terminal before update with the updated route information of the first terminal, the first terminal may send a third message to the second terminal to notify the second terminal that the first terminal has replaced the route information. In other words, the third message may indicate that the first terminal has replaced the route information of the first terminal before update with the updated route information of the first terminal. That the second terminal replaces the stored route information of the first terminal before update with the updated route information of the first terminal may be performed after the third message is received.

In another possible design, after updating the route information of the first terminal to generate the updated route information of the first terminal, the second terminal may replace the stored route information of the first terminal before update with the updated route information of the first terminal. The replacement process is not necessarily performed after the third message is received. A time sequence of performing the replacement process by the second terminal is not limited in this application.

In a possible design, before the second terminal updates the route information of the first terminal, the method further includes: The second terminal receives a first message from the first terminal, where the first message indicates the second terminal to update the route information of the first terminal; and that the second terminal updates the route information of the first terminal includes: The second terminal updates the route information of the first terminal based on the first message.

In this design, the foregoing update process may be initiated by the first terminal. For example, when the first terminal determines that route information needs to be updated. For example, to ensure security or privacy of data transmission, the first terminal determines that the route information needs to be updated periodically. Alternatively, when the route information of the first terminal needs to be updated because an application identifier and/or a location of the first terminal changes, the first terminal may send the first message to the second terminal, to indicate the second terminal to update the route information of the first terminal.

In a possible design, the route information update method may be implemented based on a process of updating a link identifier of the first terminal. The first message is a link identifier update request message, and the second message is a link identifier update response message. The first message includes an updated layer 2 identifier of the first terminal;

and the method further includes: The second terminal updates a layer 2 identifier of the second terminal, to generate an updated layer 2 identifier of the second terminal, where the second message further includes the updated layer 2 identifier of the second terminal.

In this design, the foregoing third message may be a link identifier update acknowledgement message.

Optionally, the second message sent by the second terminal to the first terminal may further include an updated layer 2 identifier of the first terminal. After receiving the link identifier update response message, the first terminal may further determine whether the updated layer 2 identifier of the first terminal included in the second message is the same as the updated layer 2 identifier that is of the first terminal and that is sent by the first terminal in the first message, to implement verification and ensure update accuracy. If the first terminal obtains, through verification, that the two updated layer 2 identifiers of the first terminal are different, the first terminal may send a rejection message to the second terminal, and does not perform subsequent steps. If the two updated layer 2 identifiers of the first terminal are same, subsequent steps are performed.

Optionally, in the foregoing route information update method, the first message may further include the route information of the first terminal before update, and may be used by the second terminal to determine the previous route information of the first terminal, in other words, the route information of the first terminal before update.

In a possible design, the route information of the first terminal includes first route information and second route information, the first route information is route information used when the first terminal directly communicates with the second terminal, and the second route information is route information used when the first terminal uses the relay function of the second terminal. The first message includes an update indication, where the update indication indicates the second terminal to update the second route information; and the updated route information of the first terminal is updated second route information.

Alternatively, the first terminal may send the first route information generated by the first terminal to the second terminal, to perform direct communication between the first terminal and the second terminal.

In a possible design, the first message may further include a layer 2 identifier of the first terminal before update and the layer 2 identifier of the second terminal before update that may be used by the second terminal to determine a sender identity of the first message.

For example, when one or more first terminals use the relay function of the second terminal, the second terminal may determine, based on the layer 2 identifier of the first terminal before update and the layer 2 identifier of the second terminal before update that are included in the first message, a specific terminal in the one or more first terminals that sends the first message.

In a possible design, the method further includes: The second terminal generates updated route information of the second terminal based on the first message, where the second message further includes the updated route information of the second terminal.

In a possible design, when the first device includes the network device, the method further includes: The second terminal sends the updated route information of the first terminal to the network device.

In a possible design, the first message further includes identification information of a fourth terminal, and the fourth terminal includes the third terminal; and the method further includes: The second terminal sends the updated route information of the first terminal to the fourth terminal based on the identification information of the fourth terminal.

In this design, a specific third terminal to which the second terminal sends the updated route information of the first terminal is determined based on an indication from the first terminal, and the first terminal may send the identification information of the fourth terminal to the first terminal for indication. For example, the first terminal may send the identification information of the fourth terminal to the second terminal by using the first message. As a result, on-demand update is considered. Only the third terminal that needs to communicate with the first terminal can obtain the updated route information of the first terminal, so that a case in which each operation of third terminal is additionally notified can be avoided.

In a possible design, the method further includes: The second terminal updates route information of the third terminal to generate updated route information of the third terminal; and the second terminal sends the updated route information of the third terminal to the third terminal and the first terminal.

For example, that the second terminal updates route information of the third terminal includes: The second terminal updates the route information of the third terminal after receiving the first message from the first terminal.

In this design, the route information of the first terminal and the route information of the third terminal can be updated simultaneously, so that the following case can be avoided: an attacker determines, based on the same route information of the third terminal, that the route information before update and the updated route information of the first terminal belong to a same first terminal. This can avoid an association attack.

In a possible design, when the first device includes the network device, the method further includes: The second terminal sends a first radio resource control RRC message to the network device, where the first RRC message includes identification information of an air interface that provides data transmission for the first terminal, and the first RRC message indicates the network device to update the identification information; and the second terminal receives a second RRC message from the network device, where the second RRC message includes updated identification information.

This design may be applied to a scenario in which there is an end-to-end protection mechanism between the first terminal and the network device. In this case, an end-to-end parameter that can be used to identify the first terminal and that is between the first terminal and the network device needs to be updated.

According to a second aspect, an embodiment of this application provides a communication apparatus. The apparatus has functions of implementing the method according to the first aspect. The functions may be implemented by hardware, or may be implemented by hardware executing corresponding software. The hardware or the software includes one or more units or modules corresponding to the functions of the method according to the first aspect, for example, a processing unit and a transceiver unit.

According to a third aspect, an embodiment of this application further provides a communication apparatus, including: a processor, configured to execute computer instructions stored in a memory, where when the computer instructions are executed, the apparatus is enabled to perform the method according to any one of the first aspect or the possible designs of the first aspect.

According to a fourth aspect, an embodiment of this application further provides a communication apparatus, including a processor and an interface circuit, where the processor is configured to: communicate with another apparatus through the interface circuit, and perform the method according to any one of the first aspect or the possible designs of the first aspect.

The communication apparatuses according to the second aspect to the fourth aspect may be used in a second terminal having a relay function.

According to a fifth aspect, an embodiment of this application further provides a computer-readable storage medium, including computer software instructions, where when the computer software instructions are run in an electronic device, for example, a second terminal having a relay function, or a chip built in the electronic device, the electronic device is enabled to perform the method according to any one of the first aspect or the possible designs of the first aspect.

It may be understood that, for advantageous effects that can be achieved in the second aspect to the fifth aspect, refer to the advantageous effects according to any one of the first aspect or the possible designs of the first aspect. Details are not described herein again.

According to a sixth aspect, an embodiment of this application provides a route information update method. The method includes: A first terminal generates a first message, where the first message indicates a second terminal to update route information of the first terminal, and the first terminal communicates with a first device based on the route information of the first terminal using a relay function of the second terminal, where the first device includes a third terminal and/or a network device; the first terminal sends the first message to the second terminal; the first terminal receives a second message from the second terminal, where the second message includes updated route information of the first terminal; and the first terminal replaces the route information of the first terminal before update with the updated route information of the first terminal.

In a possible design, the first message is a link identifier update request message, and the second message is a link identifier update response message, and before the first terminal generates the first message, the method further includes: The first terminal updates a layer 2 identifier of the first terminal, to generate an updated layer 2 identifier of the first terminal, where the first message includes the updated layer 2 identifier of the first terminal, and the second message further includes an updated layer 2 identifier of the second terminal.

In a possible design, the route information of the first terminal includes first route information and second route information, the first route information is route information used when the first terminal directly communicates with the second terminal, and the second route information is route information used when the first terminal uses the relay function of the second terminal. The first message includes an update indication, where the update indication indicates the second terminal to update the second route information; and the updated route information of the first terminal is updated second route information.

In a possible design, the second message further includes updated route information of the second terminal.

In a possible design, the first message further includes identification information of a fourth terminal, and the fourth terminal includes the third terminal.

In a possible design, the method further includes: The first terminal sends the updated route information of the first terminal to a fourth terminal via the second terminal, where the fourth terminal includes the third terminal.

In this design, the first terminal may transparently transmit the updated route information of the first terminal to the third terminal via the second terminal. Optionally, after receiving the updated route information of the first terminal, the third terminal may actively initiate, to the second terminal, update of route information of the third terminal.

In a possible design, the method further includes: The first terminal receives updated route information of the third terminal from the second terminal.

The method according to the sixth aspect corresponds to some steps according to the method in the first aspect, and the corresponding steps are steps performed by the first terminal. Therefore, advantageous effects that are the same as those in the first aspect are not described herein again.

According to a seventh aspect, an embodiment of this application provides a communication apparatus. The apparatus has functions of implementing the method in the sixth aspect. The functions may be implemented by hardware, or may be implemented by hardware executing corresponding software. The hardware or the software includes one or more units or modules corresponding to the functions of the method in the sixth aspect, for example, a processing unit and a transceiver unit.

According to an eighth aspect, an embodiment of this application further provides a communication apparatus, including: a processor, configured to execute computer instructions stored in a memory, where when the computer instructions are executed, the apparatus is enabled to perform the method according to any one of the sixth aspect or the possible designs of the sixth aspect.

According to a ninth aspect, an embodiment of this application further provides a communication apparatus, including a processor and an interface circuit, where the processor is configured to: communicate with another apparatus through the interface circuit, and perform the method according to any one of the sixth aspect or the possible designs of the sixth aspect.

The communication apparatuses according to the seventh aspect to the ninth aspect may be used in a first terminal, where the first terminal communicates with a first device by using route information of the first terminal and by using a relay function of a second terminal.

According to a tenth aspect, an embodiment of this application further provides a computer-readable storage medium, including computer software instructions, where when the computer software instructions are run in an electronic device, for example, the foregoing first terminal, or a chip built in the electronic device, the electronic device is enabled to perform the method according to any one of the sixth aspect or the possible designs of the sixth aspect.

It may be understood that, for advantageous effects that can be achieved in the seventh aspect to the tenth aspect, refer to the advantageous effects according to any one of the sixth aspect or the possible designs of the sixth aspect. Details are not described herein again.

According to an eleventh aspect, an embodiment of this application provides a route information update method. The method includes: A third terminal communicates with a first device by using route information of the third terminal and by using a relay function of a second terminal, where the first device includes a first terminal and/or a network device; the third terminal receives updated route information of the first terminal from the second terminal; the third terminal sends, to the second terminal, a message indicating the second terminal to update the route information of the third terminal; and the third terminal receives updated route information of the third terminal from the second terminal.

In the method, the updated route information of the first terminal is transparently transmitted by the first terminal to the third terminal via the second terminal. After receiving the updated route information of the first terminal, the third terminal may actively initiate, to the second terminal, update of the route information of the third terminal.

According to a twelfth aspect, an embodiment of this application provides a communication apparatus. The apparatus has functions of implementing the method in the eleventh aspect. The functions may be implemented by hardware, or may be implemented by hardware executing corresponding software. The hardware or the software includes one or more units or modules corresponding to the functions of the method in the eleventh aspect, for example, a processing unit and a transceiver unit.

According to a thirteenth aspect, an embodiment of this application further provides a communication apparatus, including: a processor, configured to execute computer instructions stored in a memory. When the computer instructions are executed, the apparatus is enabled to perform the method according to any one of the eleventh aspect or the possible designs of the eleventh aspect.

According to a fourteenth aspect, an embodiment of this application further provides a communication apparatus, including a processor and an interface circuit. The processor is configured to: communicate with another apparatus through the interface circuit, and perform the method according to any one of the eleventh aspect or the possible designs of the eleventh aspect.

The communication apparatuses according to the twelfth aspect to the fourteenth aspect may be used in a third terminal.

According to a fifteenth aspect, an embodiment of this application further provides a computer-readable storage medium, including computer software instructions. When the computer software instructions are run in an electronic device, for example, a third terminal, or a chip built in the electronic device, the electronic device is enabled to perform the method according to any one of the eleventh aspect or the possible designs of the eleventh aspect.

It may be understood that, for advantageous effects that can be achieved in the twelfth aspect to the fifteenth aspect, refer to the advantageous effects according to any one of the eleventh aspect or the possible designs of the eleventh aspect. Details are not described herein again.

According to a sixteenth aspect, an embodiment of this application provides a route information update method. The method includes: A network device communicates with a first terminal via a second terminal; the network device receives a first RRC message from the second terminal, where the first RRC message includes identification information of an air interface that provides data transmission for the first terminal, and the first RRC message indicates the network device to update the identification information; the network device updates, based on the first RRC message, the identification information of the air interface that provides data transmission for the first terminal, to generate updated identification information; and the network device sends a second RRC message to the second terminal, where the second RRC message includes the updated identification information.

The method is applicable to a scenario in which there is an end-to-end protection mechanism between a first terminal that uses a relay function of a second terminal and the network device. In this case, an end-to-end parameter that can be used to identify the first terminal and that is between the first terminal and the network device needs to be updated, for example, the identification information of the air interface that provides data transmission for the first terminal.

In a possible design, that the network device receives a first RRC message from the second terminal includes: The network device receives the first RRC message sent after the second terminal updates route information of the first terminal.

According to a seventeenth aspect, an embodiment of this application provides a communication apparatus. The apparatus has functions of implementing the method in the sixteenth aspect. The functions may be implemented by hardware, or may be implemented by hardware executing corresponding software. The hardware or the software includes one or more units or modules corresponding to the functions of the method in the sixteenth aspect, for example, a processing unit and a transceiver unit.

According to an eighteenth aspect, an embodiment of this application further provides a communication apparatus, including: a processor, configured to execute computer instructions stored in a memory. When the computer instructions are executed, the apparatus is enabled to perform the method according to any one of the sixteenth aspect or the possible designs of the sixteenth aspect.

According to a nineteenth aspect, an embodiment of this application further provides a communication apparatus, including a processor and an interface circuit. The processor is configured to: communicate with another apparatus through the interface circuit, and perform the method according to any one of the sixteenth aspect or the possible designs of the sixteenth aspect.

The communication apparatuses according to the seventeenth aspect to the nineteenth aspect may be used in a network device.

According to a twentieth aspect, an embodiment of this application further provides a computer-readable storage medium, including computer software instructions. When the computer software instructions are run in an electronic device, for example, a network device, or a chip built in the electronic device, the electronic device is enabled to perform the method according to any one of the sixteenth aspect or the possible designs of the sixteenth aspect.

It may be understood that, for advantageous effects that can be achieved in the seventeenth aspect to the twentieth aspect, refer to the advantageous effects according to any one of the sixteenth aspect or the possible designs of the sixteenth aspect. Details are not described herein again.

According to a twenty-first aspect, an embodiment of this application further provides a communication apparatus, including a transceiver unit and a processing unit. The transceiver unit may be configured to send and receive information, or configured to communicate with another network element. The processing unit may be configured to process data. For example, the apparatus may implement the method according to any one of the first aspect, the sixth aspect, the eleventh aspect, and the sixteenth aspect by using a transceiver unit and a processing unit.

According to a twenty-second aspect, an embodiment of this application further provides a computer program product, where when the computer program product is executed, the method according to any one of the first aspect, the sixth aspect, the eleventh aspect, and the sixteenth aspect may be implemented.

According to a twenty-third aspect, an embodiment of this application further provides a chip system, where the chip system is used in an electronic device (for example, the foregoing first terminal, second terminal, third terminal, or network device). The chip system includes one or more interface circuits and one or more processors. The interface circuit and the processor are interconnected through a cable. The processor receives and executes computer instructions from a memory of an electronic device through the interface circuit, to implement the method according to any one of the first aspect, the sixth aspect, and the sixteenth aspect.

According to a twenty-fourth aspect, an embodiment of this application further provides a communication system, where the communication system includes at least a first terminal, a second terminal, and a third terminal. The first terminal is configured to implement the method according to the sixth aspect. The second terminal is configured to implement the method according to the first aspect. The third terminal is configured to implement the method according to the eleventh aspect.

According to a twenty-fifth aspect, an embodiment of this application further provides a communication system. The communication system includes at least a first terminal, a second terminal, and a network device. The first terminal is configured to implement the method according to the sixth aspect. The second terminal is configured to implement the method according to the first aspect. The network device is configured to implement the method according to the sixteenth aspect.

It may be understood that, for advantageous effects that can be achieved in the twenty-first aspect to the twenty-fifth aspect, refer to the advantageous effects according to the first aspect, the sixth aspect, the eleventh aspect, the sixteenth aspect, and the like. Details are not described herein again.

BRIEF DESCRIPTION OF DRAWINGS

FIG. 13A and FIG. 13B is another schematic flowchart of a route information update method according to an embodiment of this application;

FIG. 14A and FIG. 14B is another schematic flowchart of a route information update method according to an embodiment of this application;

DESCRIPTION OF EMBODIMENTS

Embodiments of this application are applicable to a short-distance service communication scenario. Short-distance service communication is also referred to as proximity service (proximity service) communication. Application scenarios of embodiments of this application are first described with reference to FIG. 1 and FIG. 2.

Figures 1, 2, 3:
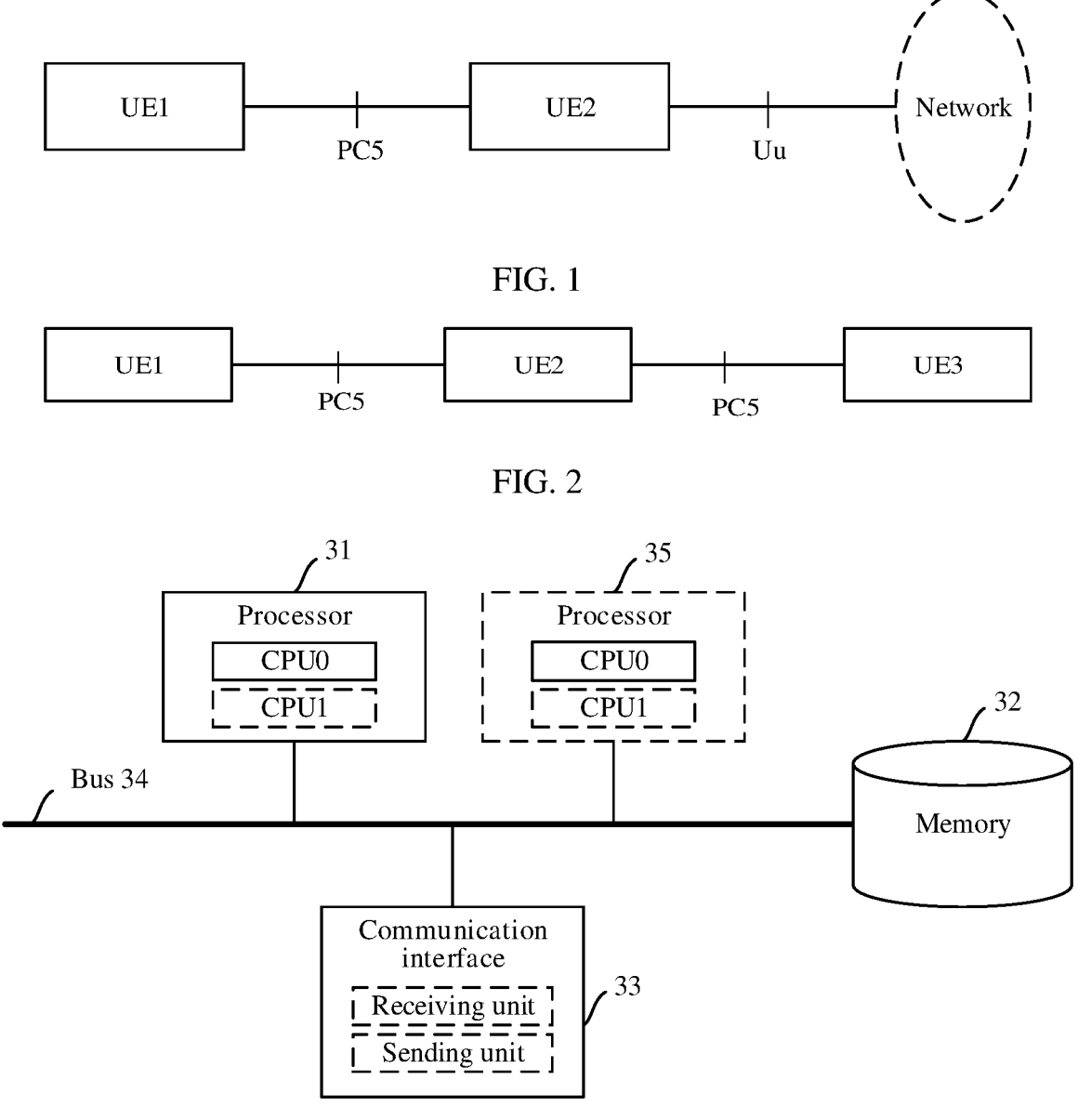
FIG. 1 is a schematic diagram of a short-distance service communication scenario.
FIG. 2 is a schematic diagram of another short-distance service communication scenario.
FIG. 3 is a schematic composition diagram of an electronic device according to an embodiment of this application.

FIG. 1 is a schematic diagram of a short-distance service communication scenario. As shown in FIG. 1, a short-distance service communication scenario may include: user equipment (user equipment, UE) 1, UE2, and a network (network). The UE1 may be connected to the UE2, and the UE2 may be connected to the network (network) (for example, the UE2 may be connected to a network device for accessing the network), so that the UE1 may communicate with the network via the UE2, to implement data transmission between the UE1 and the network.

In the short-distance service communication scenario shown in FIG. 1, the UE2 plays a role of a relay from the UE1 to the network (UE-to-network relay), so that a coverage capability of the network for the UE1 can be improved. An interface between the UE1 and the UE2 is a PC5 interface, and an interface between the UE2 and the network is a Uu interface.

FIG. 2 is a schematic diagram of another short-distance service communication scenario. As shown in FIG. 2, another short-distance service communication scenario may include UE1, UE2, and UE3. The UE1 may be connected to the UE2, and the UE2 may be connected to the UE3, so that the UE1 may communicate with the UE3 via the UE2, to implement data transmission between the UE1 and the UE3.

In the short-distance service communication scenario shown in FIG. 2, the UE2 plays a role of a relay from the UE1 to the UE3 (UE-to-UE relay), so that a communication distance between the UE1 and the UE3 can be increased. An interface between the UE1 and the UE2 is a PC5 interface, and an interface between the UE2 and the UE3 is also a PC5 interface.

The short-distance service communication scenarios shown in FIG. 1 and FIG. 2 may also be referred to as relay scenarios. In the relay scenario, data transmission is performed between different UEs (for example, between the UE1 and the UE2, or between the UE2 and the UE3) based on IP addresses of the UEs. To ensure security of data transmission, an IP address of UE usually needs to be updated periodically. Alternatively, when an application identifier and/or a location of UE changes, an IP address of the UE needs to be updated. However, currently, the IP address of the UE cannot be updated in the relay scenario.

Therefore, embodiments of this application provide a route information update method. The method is applicable to updating route information of UE in the foregoing relay scenarios. In the method, a second terminal may generate route information of a first terminal, where a relay function of the second terminal provides a communication service for the first terminal and a first device based on the route information of the first terminal, and the first device includes a third terminal and/or a network device. In a process in which the relay function of the second terminal provides the communication service for the first terminal and the first device based on the route information of the first terminal, the second terminal may update the route information of the first terminal, to generate updated route information of the first terminal. Then, the second terminal may send the updated route information of the first terminal to the first terminal via a message, where the message may be referred to as a second message. After receiving the updated route information of the first terminal, the first terminal replaces the route information of the first terminal before update with the updated route information of the first terminal, so that communication with the first device is subsequently implemented based on the updated route information of the first terminal by using the relay function of the second terminal. When the first device includes the third terminal, the second terminal further sends the updated route information of the first terminal to the third terminal. The third terminal may replace the stored route information of the first terminal before update with the received updated route information of the first terminal, so that data transmission is subsequently performed with the first terminal based on the updated route information of the first terminal by using the relay function of the second terminal.

In the method, the second terminal plays a role of a relay, and is configured to provide a communication service for the first terminal and the first device. The second terminal may distribute the route information of the first terminal for the first terminal, and update the route information of the first terminal. For example, in the application scenario shown in FIG. 1, the first terminal is the UE1, the second terminal is the UE2, and the first device is the network device that is configured to access the network. In the application scenario shown in FIG. 2, the first terminal is the UE1, the second terminal is the UE2, and the first device is the UE3.

It may be understood that in embodiments of this application, the first terminal and the second terminal may directly establish a secure link. The first terminal is configured to be capable of using the relay function of the second terminal. The second terminal is configured to be capable of performing the relay function, and send data of the first terminal to the first device. In some embodiments, configuration information of the first terminal (to be specific, configuring the first terminal to use the relay function of the second terminal) may be obtained from the network device or a network element in a registration procedure. For example, the network device or the network element may include a policy control function (policy control function, PCF), a unified data management (unified data management, UDM) function, a user data repository (user data repository, UDR), a ProSe function (ProSe function) entity, and the like. This is not limited herein. The PCF is used as an example. A specific configuration path may be as follows: The PCF sends configuration information to an access and mobility management function (access and mobility management function, AMF), and then the AMF sends the configuration information to the first terminal by implementing a non-access stratum (non-access stratum, NAS) message.

Similarly, a configuration process of the third terminal included in the second terminal or the first device may be the same as the configuration process of the first terminal. Details are not described herein again.

Optionally, in embodiments of this application, route information may be an IP route, a layer 2 identifier (layer 2 ID) route, or another non-IP route, for example, MAC information or a private network address. A specific type of the route information is not limited herein. The following uses an IP address as an example for description.

Optionally, terminals such as the first terminal, the second terminal, and the third terminal may also be referred to as user equipments (User Equipments, UEs), mobile stations (mobile stations, MSs), mobile terminals (mobile terminals, MTs), or the like. Alternatively, the third terminal may be referred to as a remote (remote) UE.

In some embodiments, a terminal (in embodiments of this application, the terminal is any one of the first terminal, the second terminal, and the third terminal) may be a device that provides voice and/or data connectivity for a user, for example, may be a mobile phone ("cellular" phone), a cell phone, a computer, a cordless phone, a session initiation protocol (session initiation protocol, SIP) phone, a wireless local loop (wireless local loop, WLL) station, a personal digital assistant (personal digital assistant, PDA), a laptop computer, a handheld communication device, a handheld computing device, a satellite wireless device, a wireless modem card, a television set-top box (set-top box, STB), a customer premises equipment (customer premises equipment, CPE), a wearable device (for example, a smartwatch, a smart band, or a pedometer), a vehicle-mounted device (for example, a car, a bicycle, an electric vehicle, an airplane, a ship, a train, or a high-speed railway), a virtual reality (virtual reality, VR) device, an augmented reality (augmented reality, AR) device, a wireless terminal in industrial control (industrial control), a smart home device (for example, a refrigerator, a television, an air conditioner, or an electric meter), an intelligent robot, a workshop device, a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot air balloon, an unmanned aerial vehicle, or an airplane), and another device used for communication in a wireless system. A specific representation form of the terminal is not limited in this application.

Optionally, the network device may also be referred to as an access network (access network, AN) device, for example, may be a radio access network (radio access network, RAN) device or a next-generation radio access network device. The terminal may communicate with the AN device. The AN device may provide function services such as radio resource management, quality of service management, and data encryption and compression for the terminal.

In some embodiments, the AN device may be a base station that does not support a security policy, such as a next generation NodeB (next generation NodeB, gNB), an evolved NodeB (evolved NodeB, eNB), or a next generation evolved NodeB (next generation evolved NodeB, ng-eNB). Alternatively, in some other embodiments, the AN device may be a base station that supports a security policy, for example, a 5G base station. Alternatively, in some other embodiments, the AN device may be a transmission reception point (transmission reception point, TRP), a radio network controller (radio network controller, RNC), a base station controller (base station controller, BSC), a base transceiver station (base transceiver station, BTS), a home NodeB (for example, a home evolved NodeB, or a home NodeB, HNB), a baseband unit (baseband unit, BBU), or a wireless fidelity (wireless fidelity, Wi-Fi) access point (access point, AP), a central unit (central unit, CU), a distributed unit (distributed unit, DU), a central unit-control plane (central unit-control plane, CU-CP), or central unit-user plane (central unit-user plane, CU-UP)

The following describes an example of the route information update method provided in embodiments of this application with reference to the accompanying drawings.

Notably, in descriptions of this application, words such as "first" and "second" are merely used for distinguishing and description, and are not used to specially limit a feature. In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more.

In addition, a person of ordinary skill in the art may learn that the technical solutions provided in embodiments of this application are also applicable to a similar technical problem as a network architecture evolves and a new service scenario emerges.

FIG. 3 is a schematic composition diagram of an electronic device according to an embodiment of this application. The electronic device may be the first terminal, the second terminal, or the first device (the network device or the third terminal) in embodiments of this application. As shown in FIG. 3, the electronic device may include: at least one processor 31, a memory 32, a communication interface 33, and a bus 34.

The following describes the components of the terminal in detail with reference to FIG. 3.

The processor 31 is a control center of the terminal, and may be one processor or a collective term of a plurality of processing elements. For example, the processor 31 may be a central processing unit (central processing unit, CPU), or may be an application-specific integrated circuit (application-specific integrated circuit, ASIC), or may be configured as one or more integrated circuits implementing embodiments of this application, for example, one or more microprocessors (digital signal processors, DSPs), or one or more field programmable gate arrays (field programmable gate arrays, FPGAs).

The processor 31 may run or execute a software program stored in the memory 32, to invoke data stored in the memory 32, to perform various functions of the electronic device.

During specific implementation, in an embodiment, the processor 31 may include one or more CPUs, for example, a CPU0 and a CPU1 in FIG. 3.

During specific implementation, in an embodiment, the electronic device may include a plurality of processors, for example, the processor 31 and a processor 35 shown in FIG. 3. Each of the processors may be a single-core processor (single-CPU) or may be a multi-core processor (multi-CPU). The processor herein may be one or more devices, circuits, and/or processing cores configured to process data (for example, computer program instructions).

The memory 32 is configured to store a software program for performing method steps performed by the terminal in the solutions of this application, and the processor 31 controls the execution. The memory 32 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto.

The memory 32 may exist independently, and is connected to the processor 31 through the bus 34. Alternatively, the memory 32 may be integrated with the processor 31. This is not limited herein.

The communication interface 33 is configured to communicate with another device or a communication network by using any transceiver-type apparatus. The communication interface 33 may be an Ethernet interface, a radio access network (radio access network, RAN) interface, a wireless local area network (wireless local area network, WLAN) interface, or the like. The communication interface 33 may include a receiving unit for implementing a receiving function and a sending unit for implementing a sending function.

The bus 34 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is for representing the bus in FIG. 3, but this does not mean that there is only one bus or only one type of bus.

Although the bus 34 is used in FIG. 3, it may be understood that the bus 34 may alternatively be replaced with a link relationship in another form. This is not limited to the bus.

Figure 4:
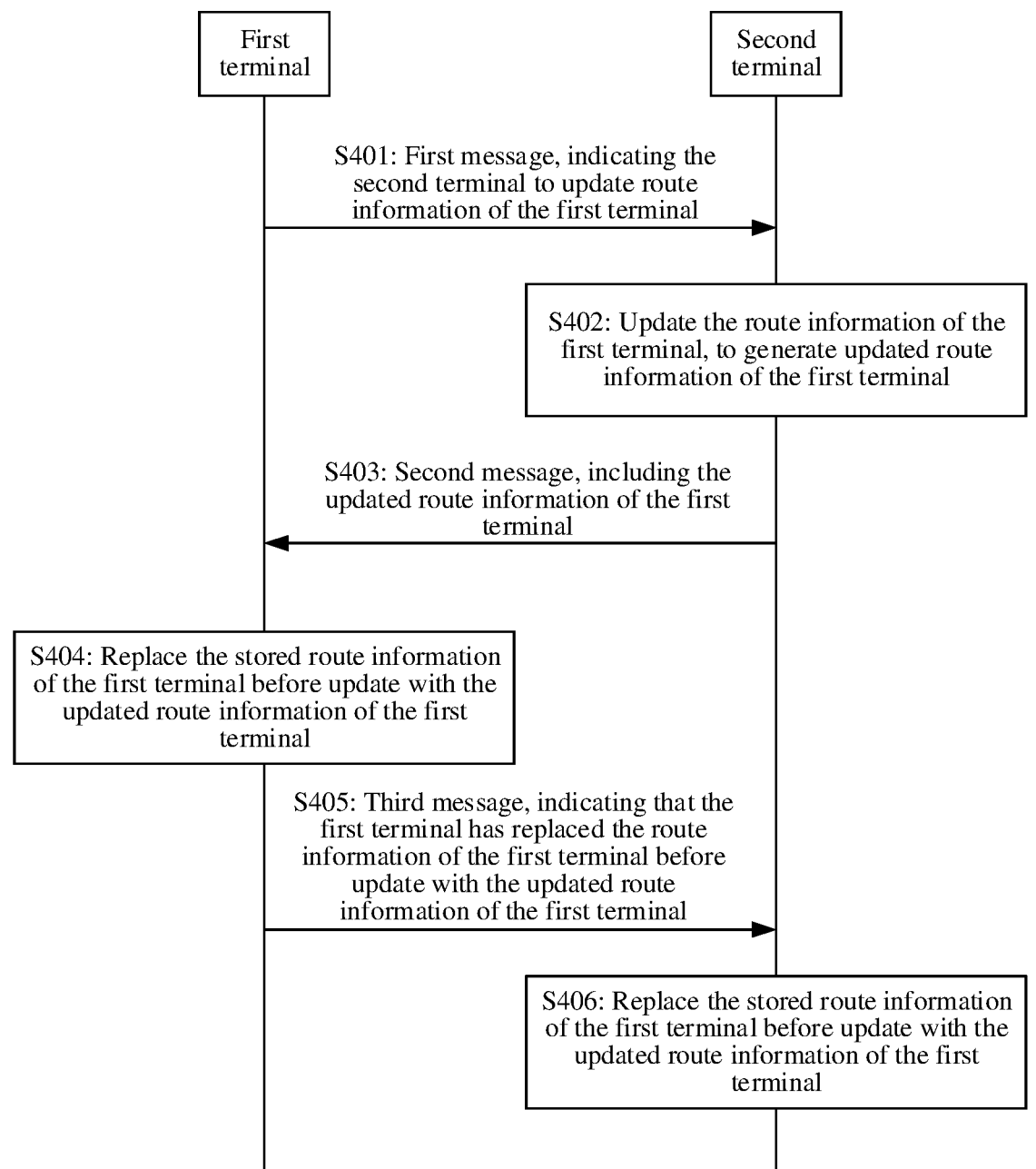
FIG. 4 is a schematic flowchart of a route information update method according to an embodiment of this application.

FIG. 4 is a schematic flowchart of a route information update method according to an embodiment of this application. As shown in FIG. 4, the route information update method may include S401 to S406.

S401: A first terminal sends a first message to a second terminal, where the first message indicates the second terminal to update route information of the first terminal.

In other words, the foregoing update process may be initiated by the first terminal. For example, when the first terminal determines that route information needs to be updated. For example, to ensure security or privacy of data transmission, the first terminal determines that the route information needs to be updated periodically. Alternatively, when the route information of the first terminal needs to be updated because an application identifier and/or a location of the first terminal changes, the first terminal may send the first message to the second terminal, to indicate the second terminal to update the route information of the first terminal.

Correspondingly, the second terminal receives the first message from the first terminal.

S402: The second terminal updates the route information of the first terminal, to generate updated route information of the first terminal.

After receiving the first message, the second terminal may update the route information of the first terminal based on an indication of the first message, to generate the updated route information of the first terminal.

S403: The second terminal sends a second message to the first terminal, where the second message includes the updated route information of the first terminal.

Correspondingly, the first terminal receives the second message from the second terminal.

S404: The first terminal replaces the stored route information of the first terminal before update with the updated route information of the first terminal.

After the replacement is completed, the first terminal may subsequently communicate with a first device based on the updated route information of the first terminal using a relay function of the second terminal.

S405: The first terminal sends a third message to the second terminal, where the third message indicates that the first terminal has replaced the route information of the first terminal before update with the updated route information of the first terminal.

Alternatively, the third message may indicate that the first terminal has received the updated route information.

Correspondingly, the second terminal receives the third message from the first terminal.

For example, after replacing the stored route information of the first terminal before update with the updated route information of the first terminal, the first terminal may send the third message to the second terminal to notify the second terminal that the first terminal has replaced the route information. After receiving the third message, the second terminal also replaces the stored route information of the first terminal before update with the updated route information of the first terminal. For example, S406 may be performed.

S406: The second terminal replaces the stored route information of the first terminal before update with the updated route information of the first terminal.

After the replacement is completed, the relay function of the second terminal may subsequently provide a communication service for the first terminal and the first device based on the updated route information of the first terminal.

Optionally, in the route information update process shown in FIG. 4, S406 may alternatively be completed after S402. To be specific, after updating the route information of the first terminal to generate the updated route information of the first terminal, the second terminal may replace the stored route information of the first terminal before update with the updated route information of the first terminal. The replacement process is not necessarily performed after the third message is received. A time sequence of performing the replacement process by the second terminal is not limited in this embodiment of this application.

In a possible design, the route information update process shown in FIG. 4 may be implemented based on a process of updating a link identifier (link identifier) of the first terminal. The first terminal may obtain, in the process of updating the link identifier, the updated route information of the first terminal issued by the second terminal.

Figure 5:
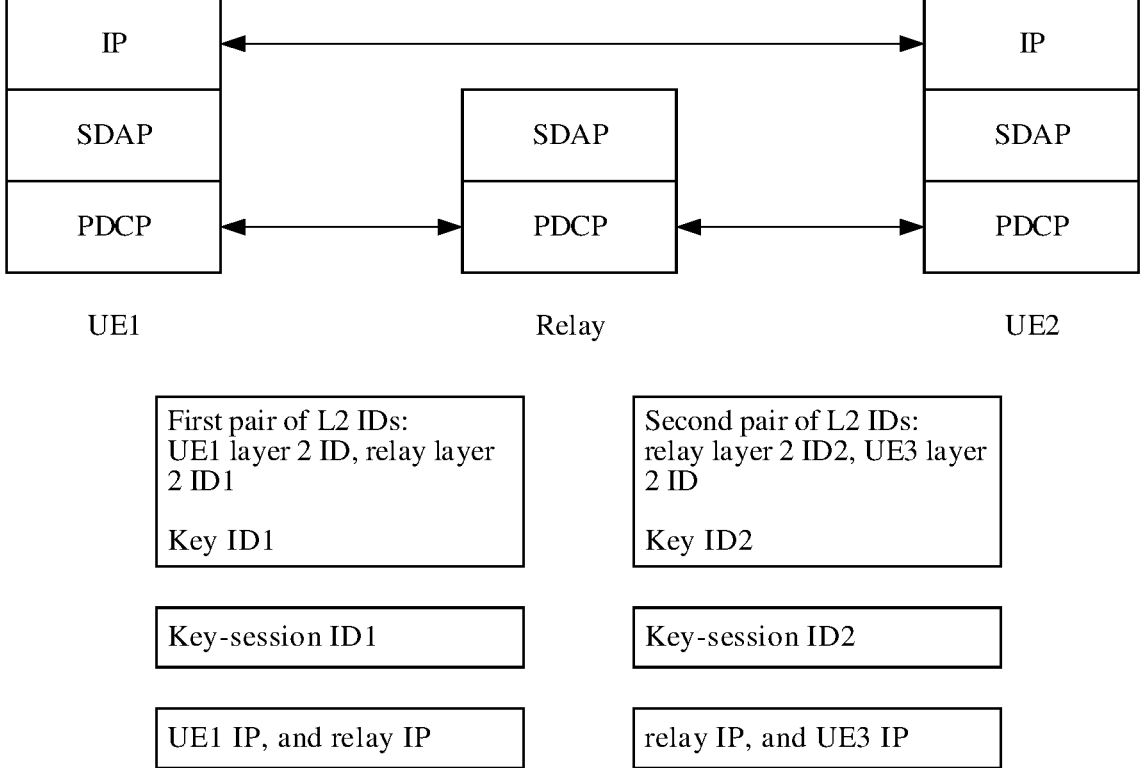
FIG. 5 is a schematic diagram of link identifiers used when UE1 communicates with UE3 via a relay.

For example, a first terminal is UE1, a second terminal is UE2 (which is referred to as a relay below), a third terminal is UE3, and route information is an IP address. FIG. 5 is a schematic diagram of link identifiers used when the UE1 communicates with the UE3 via the relay. As shown in FIG. 5, link-related identifiers of a PC5 interface between the UE1 and the relay may include layer 2 identifiers (layer 2 IDs), a key ID1 and a key-session ID1. The layer 2 identifiers include a UE1 layer 2 ID and a relay layer 2 ID1, and identify a layer 2 link between the UE1 and the relay. The key ID1 identifies a shared key between the UE1 and the relay. The key-session ID1 identifies a session key between the UE1 and the relay. An IP address of the UE1 corresponding to the UE1 layer 2 ID and the relay layer 2 ID1 is a UE1 IP address, and an IP address of the relay is relay IP1.

Still refer to FIG. 5. Link-related identifiers of a PC5 interface between the relay and the UE3 may include layer 2 identifiers (layer 2 IDs), a key ID2 and a key-session ID2. The layer 2 identifiers include a relay layer 2 ID2 and a UE3 layer 2 ID, and identify a layer 2 link between the relay and the UE3. The key ID2 identifies a shared key between the relay and the UE3. The key-session ID2 identifies a session key between the relay and the UE3. An IP address of the UE3 corresponding to the relay layer 2 ID2 and the UE3 layer 2 ID is a UE3 IP address, and an IP address of the relay is relay IP2.

The relay layer 2 ID1 and the relay layer 2 ID2 may be the same or different, and the relay IP1 and the relay IP2 may also be the same or different. This is not limited herein.

Figure 6:
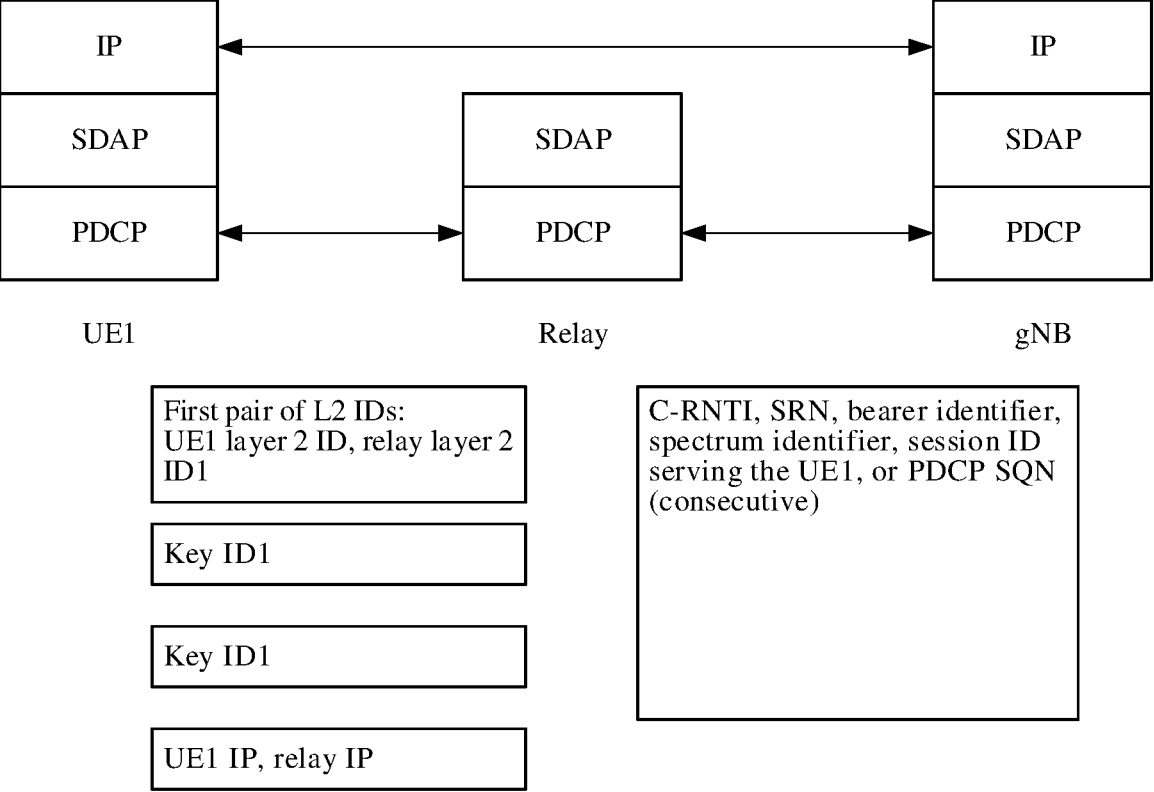
FIG. 6 is a schematic diagram of link identifiers used when UE1 communicates with a gNB via a relay.

For example, a first terminal is UE1, a second terminal is UE2 (which is referred to as a relay below), a network device is a gNB, and route information is an IP address. FIG. 6 is a schematic diagram of link identifiers used when the UE1 communicates with the gNB via the relay. As shown in FIG. 6, it is the same as the link between the UE1 and the relay in FIG. 5 that, link-related identifiers of a PC5 interface between the UE1 and the relay may include layer 2 identifiers (layer 2 IDs), a key ID1 and a Key-session ID1. The layer 2 identifiers include a UE1 layer 2 ID and a relay layer 2 ID1, and identify a layer 2 link between the UE1 and the relay. The key ID1 identifies a shared key between the UE1 and the relay. The key-session ID1 identifies a session key between the UE1 and the relay. An IP address of the UE1 corresponding to the UE1 layer 2 ID and the relay layer 2 ID1 is UE1 IP, and an IP address of the relay is relay IP1.

Still refer to FIG. 6. Link-related identifiers of a Uu interface between the relay and the gNB may be identifiers shared between the relay and the gNB, and identify a wireless or wired link between the relay and the gNB. For example, the identifiers may include a C-RNTI, an SRN, a bearer identifier (or referred to as an air interface identifier), a spectrum identifier, a session ID serving the UE1, a PDCP SQN, and the like. The bearer identifier is identification information of a radio bearer (which is also referred to as an air interface) that provides data transmission for the UE1.

When the implementation is based on the process of updating the link identifier of the first terminal, the first message may be a link identifier update request (link identifier update request) message, the second message may be a link identifier update response (link identifier update response) message, and the third message may be a link identifier update acknowledgement (link identifier update acknowledgement/ACK) message.

Figure 7:
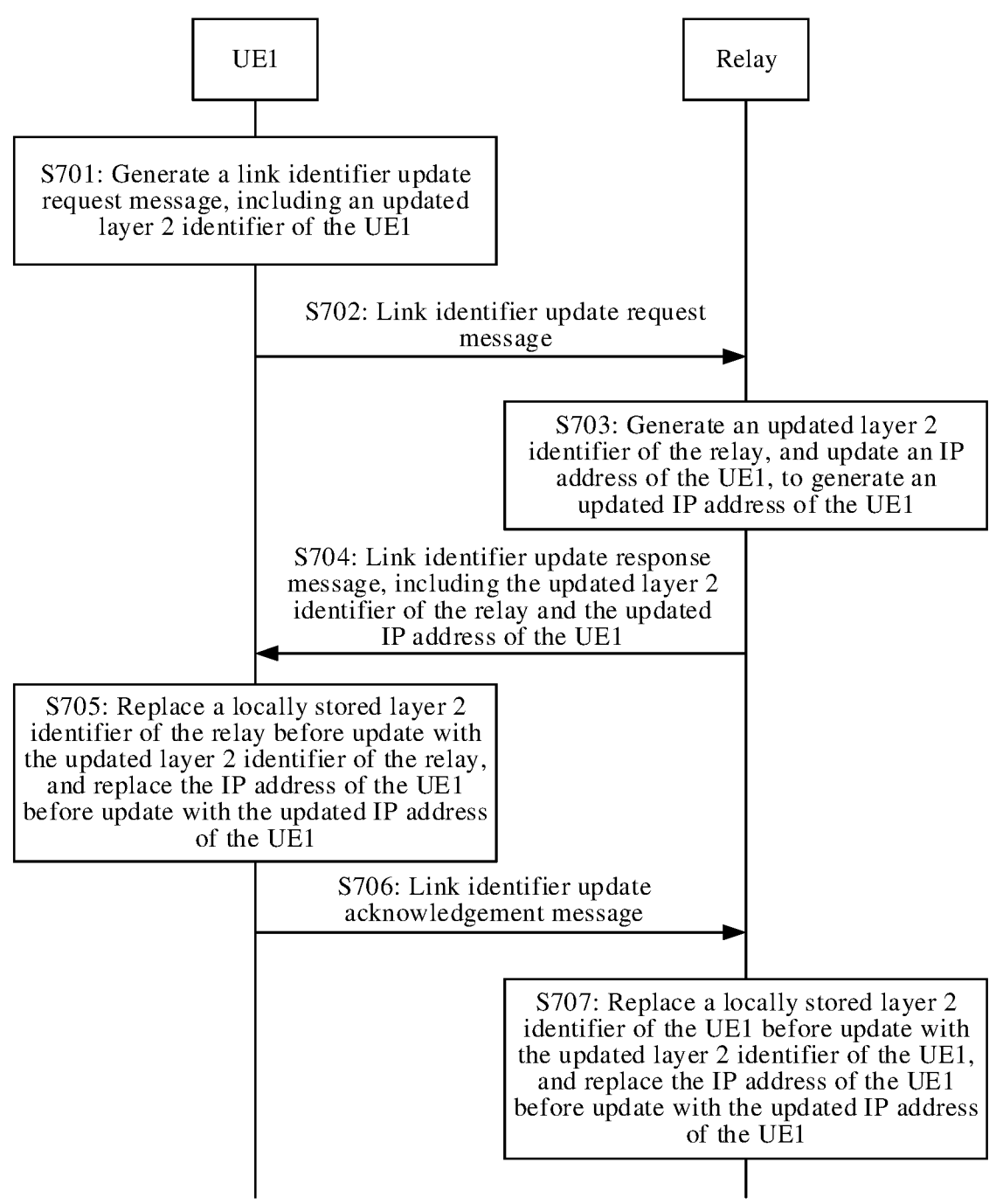
FIG. 7 is another schematic flowchart of a route information update method according to an embodiment of this application.

FIG. 7 is used below as an example. It is assumed that a first terminal is UE1, a second terminal is UE2 (which is referred to as a relay below), a third terminal is UE3, and route information is an IP address. The following describes an example of a manner in which the UE1 updates route information in a process of updating a link identifier. Secure links are established between the UE1 and the relay, and between the relay and the UE3.

FIG. 7 is another schematic flowchart of a route information update method according to an embodiment of this application. As shown in FIG. 7, the route information update method may include S701 to S707.

S701: The UE1 generates a link identifier update request message, where the link identifier update request message includes an updated layer 2 identifier of the UE1 (UE1 new layer 2 ID).

For example, when determining to update a link identifier (for a condition for determining to update, refer to the condition for determining to update the route information by the first terminal in the foregoing embodiment), the UE1 may reselect a layer 2 identifier, obtain an updated layer 2 identifier of the UE1, and then generate a link identifier update request message that carries the updated layer 2 identifier of the UE1.

Optionally, the link identifier update request message may further include an MSB of a Key-sess ID, an updated application identifier of the UE1, and the like.

S702: The UE1 sends the link identifier update request message to the relay.

The link identifier update request message indicates the relay to update an IP address of the UE1.

Correspondingly, the relay receives the link identifier update request message.

S703: The relay generates an updated layer 2 identifier (relay new layer 2 ID) of the relay, and updates the IP address of the UE1 to generate an updated IP address of the UE1 (new UE1 IP).

After generating the updated layer 2 identifier of the relay, the relay replaces a layer 2 identifier of the relay before update with the updated layer 2 identifier of the relay.

S704: The relay sends a link identifier update response message to the UE1, where the link identifier update response message includes the updated layer 2 identifier of the relay and the updated IP address of the UE1.

Correspondingly, the UE1 receives the link identifier update response message.

Herein, optionally, the link identifier update response message sent by the relay to the UE1 may further include an updated layer 2 identifier of the UE1. After receiving the link identifier update response message, the UE1 may further determine whether the updated layer 2 identifier of the UE1 included in the link identifier update response message is the same as the updated layer 2 identifier that is of the UE1 and that is sent by the UE1 in the link identifier update request message, to implement verification and ensure update accuracy. If the UE1 obtains, through verification, that the two updated layer 2 identifiers of the UE1 are different, the UE1 may send a reject message to the relay, and does not perform the following steps. If the two updated layer 2 identifiers of the UE1 are same, the following steps are performed.

Optionally, the link identifier update response message may further include an LSB of a Key-sess ID, an updated application identifier of the UE2, and the like.

S705: The UE1 replaces the locally stored layer 2 identifier of the relay before update (relay old layer 2 ID) with the updated layer 2 identifier of the relay, and replaces an IP address of the UE1 before update (old UE1 IP) with the updated IP address of the UE1.

S706: The UE1 sends a link identifier update acknowledgement message to the relay.

The link identifier update acknowledgement message indicates that the UE1 has replaced the locally stored IP address of the UE1 before update with the updated IP address of the UE1, or the UE1 has received the updated IP address of the UE1.

Optionally, the link identifier update acknowledgement message sent by the UE1 to the relay may further include an updated IP address of the UE1. After receiving the link identifier update acknowledgement message, the relay may further determine whether the updated IP address of the UE1 included in the link identifier update acknowledgement message is the same as the updated IP address that is of the UE1 and that is sent by the relay in the link identifier update response message, to implement further verification and ensure update accuracy. If the relay obtains, through verification, that the two updated IP addresses of the UE1 are different, the relay may send a reject message to the UE1, and does not perform the following steps. If the two updated IP addresses of the UE1 are same, the following steps are performed.

Similarly, the link identifier update acknowledgement message sent by the UE1 to the relay may further include an updated layer 2 identifier of the relay. After receiving the link identifier update acknowledgement message, the relay may further determine whether the updated layer 2 identifier of the relay included in the link identifier update acknowledgement message is the same as the updated layer 2 identifier that is of the relay and that is sent by the relay in the link identifier update response message, to implement further verification and ensure update accuracy. If the relay obtains, through verification, that the two updated layer 2 identifiers of the relay are different, the relay may send a reject message to the UE1, and does not perform the following steps. If the two updated layer 2 identifiers of the relay are same, the following steps are performed.

S707: The relay replaces the locally stored layer 2 identifier of the UE1 before update (UE1 old layer 2 ID) with the updated layer 2 identifier of the UE1, and replaces the IP address of the UE1 before update with the updated IP address of the UE1.

In the process shown in FIG. 7, sharing of updated layer 2 identifiers between the UE1 and the UE2 and update of the IP address of the UE1 are completed. Subsequently, the relay stores a correspondence between the updated layer 2 identifier of the UE1 and the updated IP address of the UE1, and provides a communication service for the UE1 and another device (for example, the UE3) based on the correspondence.

Optionally, the action that the relay replaces the locally stored layer 2 identifier of the UE1 before update (UE1 old layer 2 ID) with the updated layer 2 identifier of the UE1 may occur in any step performed after the relay generates the updated layer 2 identifier of the UE1. This is not limited. For example, the action is performed in S707, or is performed after S703.

Optionally, the action that the relay replaces the locally stored IP address of the UE1 before update with the updated IP address of the UE1 may occur in any step performed after the relay generates the updated IP address of the UE1. This is not limited. For example, the action is performed in S707, or is performed after S703.

Optionally, the key-session ID may be replaced with a key ID. In other words, the key ID is updated.

Optionally, the relay may further replace an IP address of the UE1 before update with an updated IP address of the UE1 in a context of the UE1.

Optionally, in the route information update method shown in FIG. 7, the link identifier update request message sent by the UE1 to the relay may further include the IP address of the UE1 before update that may be used by the relay to determine a previous IP address of the UE1.

In some embodiments, the IP address of the UE1 includes a first IP address and a second IP address. The first IP address is an IP address used when the UE1 directly communicates with the relay, and the second IP address is an IP address used when the UE1 uses a relay function of the relay. Herein, the second IP address is an IP address issued by the relay to the UE1, and the first IP address is an IP address generated by the UE1. The link identifier update request message sent by the UE1 to the relay may further include an update indication that may indicate the relay to update the second IP address. The relay may update the second IP address based on the update indication. In this case, the updated IP address of the UE1 included in the link identifier update response message sent by the relay to the UE is an updated second IP address.

Certainly, it may be understood that, in this embodiment of this application, the UE1 may alternatively send, to the relay, the first IP address generated by the UE1, for direct communication between the UE1 and the relay.

In a possible design, the link identifier update request message sent by the UE1 to the relay may further include the layer 2 identifier of the UE1 before update and the layer 2 identifier of the relay before update that may be used by the relay to determine a sender identity of the link identifier update request message. For example, when one or more UE1s use the relay function of the relay, the relay may determine, based on the layer 2 identifier of the UE1 before update and the layer 2 identifier of the relay before update that are included in the link identifier update request message, a specific UE1 in the one or more UE1s that sends the link identifier update request message.

Optionally, in the embodiment shown in FIG. 7, after receiving the first message, the relay may further update an IP address of the relay, and send an updated IP address of the relay to the UE1. For example, the link identifier update response message may further include the updated IP address of the relay (new relay IP). The UE1 may replace the locally stored IP address of the relay before update (old relay IP) with the received updated IP address of the relay. Optionally, the UE1 sends the updated IP address of the relay to the relay by using S706, so that the relay verifies whether the updated IP address of the relay sent in step S704 is the same as the updated IP address of the relay in step S706, to implement further verification and ensure update accuracy. If the relay obtains, through verification, that the two updated IP addresses of the relay are different, the relay may send a reject message to the UE1, and does not perform the following steps. If the two updated IP addresses of the relay are same, the following steps are performed.

Optionally, FIG. 7 mainly describes how the UE1 triggers to update a link between the UE1 and the relay. Alternatively, in some embodiments, link update between the UE1 and the relay may be actively triggered by the relay. For example, in the embodiment shown in FIG. 7, step S701 may not be performed, and the relay directly actively triggers the update (for a specific trigger reason, refer to the foregoing descriptions of triggering by the UE1), to generate an updated IP address of the UE1, and sends the updated IP address to the UE1. A specific principle is similar to that in FIG. 7. Details are not described herein again.

The embodiment shown in FIG. 7 may be applied to the scenario shown in FIG. 1, or may be applied to the scenario shown in FIG. 2.

Figure 8:
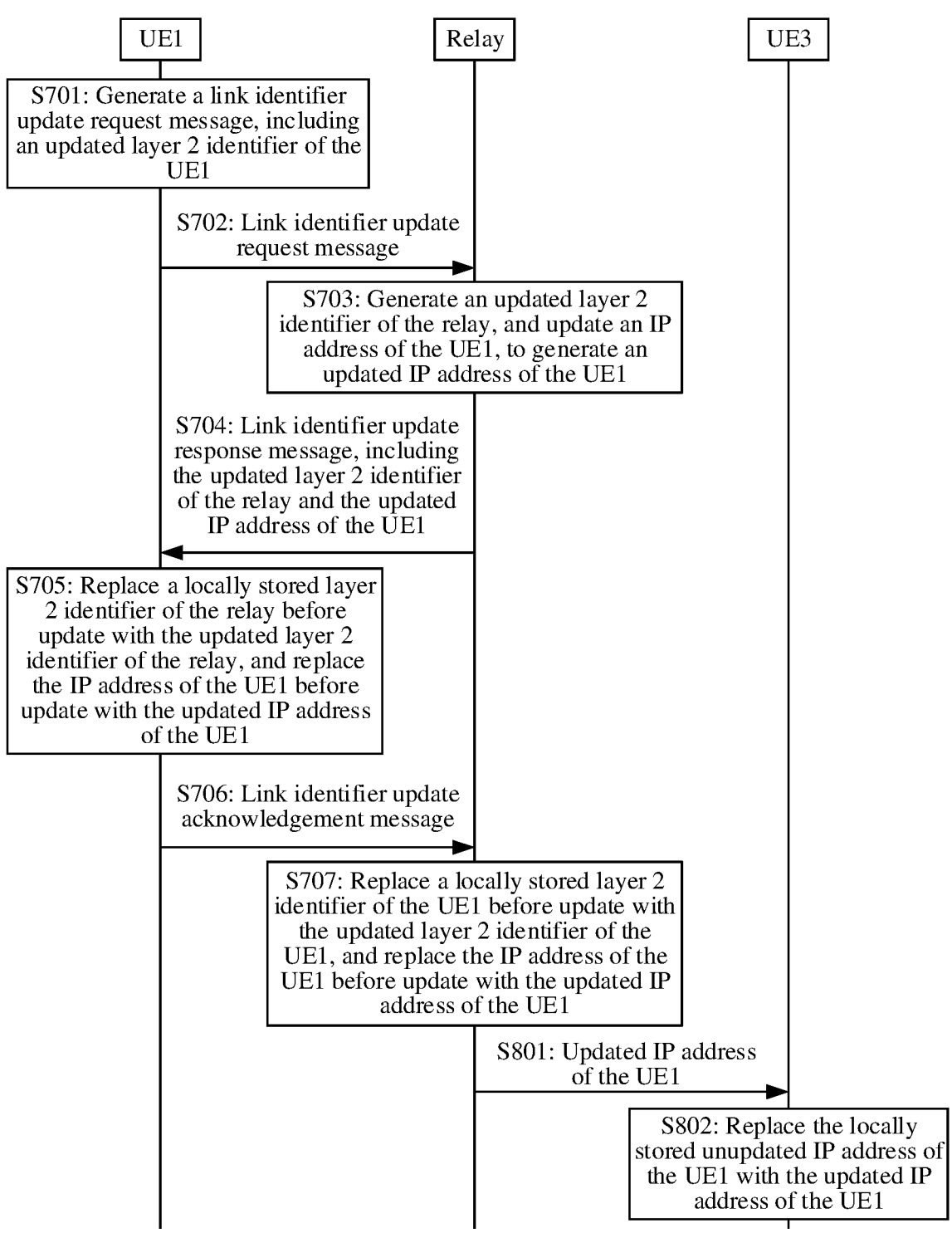
FIG. 8 is another schematic flowchart of a route information update method according to an embodiment of this application.

For the scenario shown in FIG. 2, to be specific, the scenario in which the UE1 communicates with the UE3 via the relay, the route information method further includes, based on the method shown in FIG. 7, a step of notifying the UE3 of the updated IP address of the UE1. For example, FIG. 8 is another schematic flowchart of a route information update method according to an embodiment of this application. As shown in FIG. 8, the route information update method may further include S801 and S802 based on the method shown in FIG. 7.

S801: The relay sends the updated IP address of the UE1 to the UE3.

Optionally, although S801 shown in FIG. 8 is after S707, actually, S801 may be performed at any moment after S703, for example, may be performed after S704, or may be performed simultaneously with S704. This is not limited herein. After S706 is performed, it can be ensured that the UE1 has correctly received the updated IP address of the UE1, and then S801 is triggered to be performed. It may further be explained as that the relay may notify another terminal, for example, the UE3, when the relay ensures that the UE1 uses the updated IP address of the UE1 in the future.

Optionally, the relay sends the IP address of the UE1 before update, for the UE3 to determine IP address information of which terminal needs to be updated.

S802: The UE3 replaces the locally stored IP address of the UE1 before update with the updated IP address of the UE1.

Optionally, after replacing the locally stored IP address of the UE1 before update with the updated IP address of the UE1, the UE3 may also send an acknowledgement message to the relay, to notify the relay that the UE3 has completed the replacement or has received the updated IP address of the UE1.

Optionally, the UE3 determines information about the UE1 based on the IP address of the UE1 before update, and then performs replacement.

Optionally, the UE3 sends the updated IP address of the UE1 to the relay. After receiving the acknowledgement message, the relay may further determine whether the updated IP address of the UE1 in S801 is the same as the updated IP address of the UE1 sent in S802, to implement further verification and ensure update accuracy. If the relay obtains, through verification, that the two updated IP addresses of the UE1 are different, the relay may send a reject message to the UE1, and does not perform the following steps. If the two updated IP addresses of the UE1 are same, the following steps are performed.

Subsequently, the UE3 sends data to the UE1 based on the updated IP address of the UE1.

In a possible design, when the UE1 communicates with a plurality of UE3s via the relay, the UE1 may send more identification information (for example, which is referred to as identification information of a fourth terminal, where the fourth terminal includes UE3 that communicates with the UE1) of target UE3 to the relay, and the relay may send the updated IP address of the UE1 to the target UE3 based on the identification information of the target UE3. The target UE3 is UE3 in the plurality of UE3s that communicate with the UE1 via the relay. In other words, in S801, UE3 to which the relay sends the updated IP address of the UE1 is determined based on an indication from the UE1. The UE1 may send the identification information of the target UE3 to the relay for indication. For example, the UE1 may send the identification information of the target UE3 to the relay by using the link identifier update request message.

The identification information of the target UE3 may include: an IP address of the target UE3, an application identifier of the target UE3, a layer 2 identifier of the target UE3, and the like. This is not limited herein. The target UE3 may be UE3 with which the UE1 expects to communicate.

In this design, on-demand update is considered. Only the UE3 that needs to communicate with the UE1 can obtain the updated IP address of the UE1, so that a case in which each operation of the UE3 is additionally notified can be avoided.

Alternatively, in another possible design, the relay may send, based on locally stored identification information of target UE3 that has historical communication with the UE1, the updated IP address of the UE1 to the target UE3.

Alternatively, in another possible design, there may be a dedicated relay or a common relay, and a link between the relay and the UE3 is mapped to a link between the UE1 and the relay. In this case, the relay may determine the link between the UE1 and the relay based on an identifier (for example, the UE1 layer 2 ID and old UE1 IP) that identifies the link and that is in the link identifier update request message sent by the UE1, to determine the corresponding link between the relay and the UE3 and the identification information of the target UE3, and determine to send the updated IP address of the UE1 to the corresponding UE3.

Similarly, in the scenario shown in FIG. 1, to be specific, in the scenario in which the UE1 communicates with the network device such as the gNB via the relay, when the network device needs to know the IP address of the UE1, the route information method may alternatively include a step of notifying the network device of the updated IP address of the UE1 based on the method shown in FIG. 7. This is similar to FIG. 8. Details are not described herein again. Alternatively, when the network device does not need to know the IP address of the UE1, the route information method does not include a step of notifying the network device of the updated IP address of the UE1.

Figure 9:
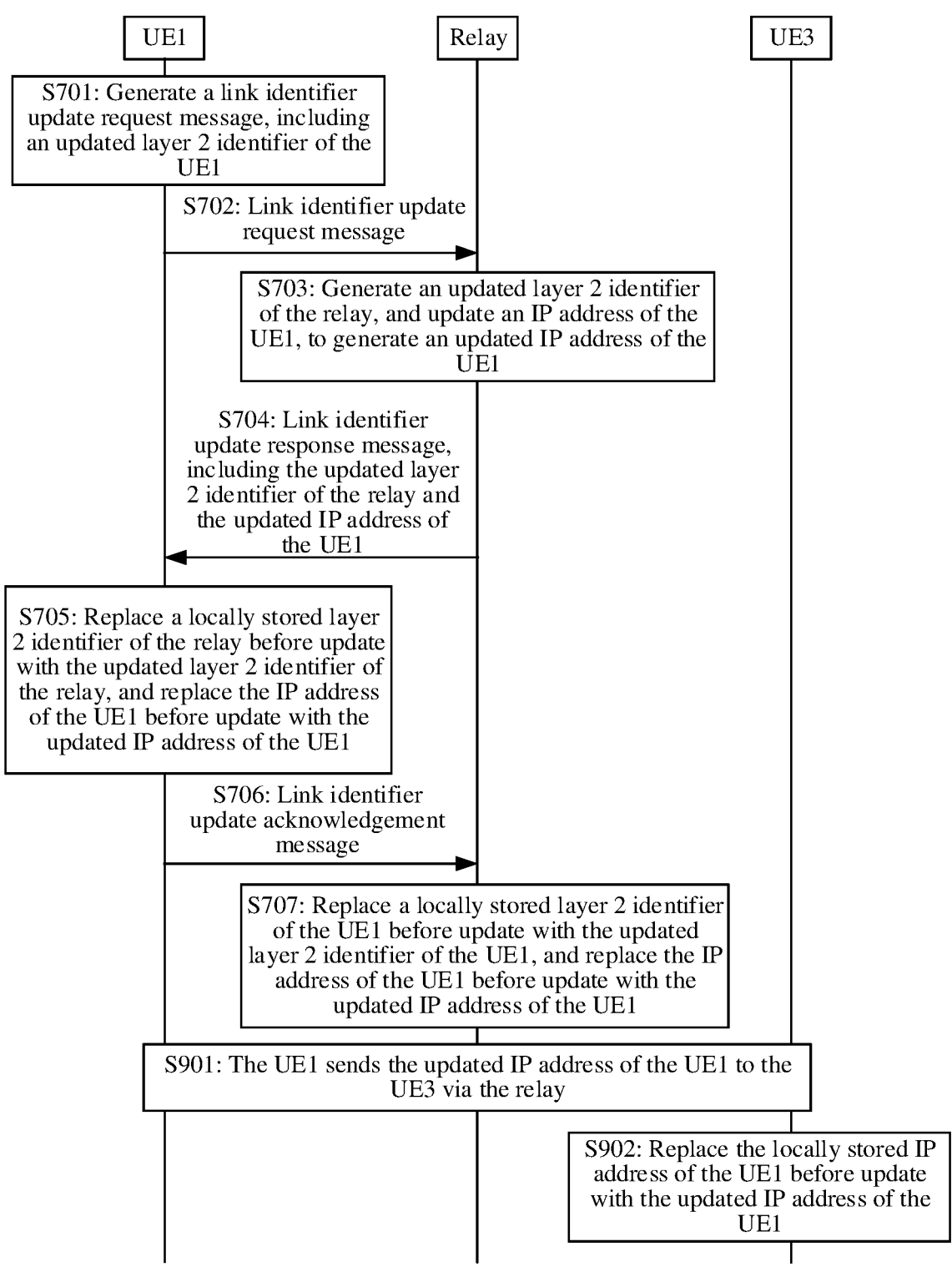
FIG. 9 is another schematic flowchart of a route information update method according to an embodiment of this application.

In the embodiment shown in FIG. 8, the relay notifies the UE3 of the updated IP address of the UE1. In some other embodiments, the UE1 may alternatively transparently transmit the updated IP address of the UE1 to the UE3 via the relay. For example, FIG. 9 is another schematic flowchart of a route information update method according to an embodiment of this application. As shown in FIG. 9, the route information update method may further include S901 and S902 based on the method shown in FIG. 7.

S901: The UE1 sends the updated IP address of the UE1 to the UE3 via the relay.

Optionally, in S901, the UE1 may transparently transmit, via the relay, the updated IP address of the UE1 to target UE3 with which the UE1 expects to communicate. Alternatively, the updated IP address of the UE1 may be transparently transmitted to all UE3s in historical communication.

It may alternatively be understood as that the UE1 sends a message to the UE3 via the relay, and logically, the UE1 and the UE3 directly communicate with each other. The relay is a proxy, and directly routes data sent by the UE1 to the UE3. It may alternatively be understood as that the relay does not modify content thereof.

Optionally, although S901 shown in FIG. 9 is after S707, actually, S901 may be performed at any moment after the UE1 receives the link identifier update response message, for example, may be performed simultaneously with S705. This is not limited herein. In other words, it may be understood as that after determining to receive the updated IP address of the UE1 distributed by the relay, the UE1 triggers S901 to send the updated IP address of the UE1 to the UE3.

Optionally, S901 carries IP address information of the UE1 before update, to identify an identity of the sender UE1.

S902: The UE3 replaces the locally stored IP address of the UE1 before update with the updated IP address of the UE1.

Optionally, after replacing the locally stored IP address of the UE1 before update with the updated IP address of the UE1, the UE3 may send an acknowledgement message to the relay and/or the UE1, to notify the relay and/or the UE1 that the UE3 has completed the replacement or has received the updated IP address of the UE1.

Herein, the UE3 determines, based on the previous IP address information of the UE1 carried in step S901, to replace the locally stored IP address of the UE1 before update with the updated IP address of the UE1 carried in step S901.

Optionally, S901 supports an integrity protection mechanism that may be an end-to-end integrity protection mechanism executed based on a shared key between the UE1 and the UE3. Currently, the UE3 performs a replacement action only after successfully verifying integrity protection in S901 by using the shared key between the UE3 and the UE1.

Alternatively, a message in S901 supports an integrity protection mechanism that may be a segment-based integrity protection mechanism executed based on a shared key between the UE1 and the relay and a shared key between the relay and the UE3. Currently, the UE3 performs a replacement action only after successfully verifying received integrity protection in S901 by using the shared key between the UE3 and the relay.

In the embodiment shown in FIG. 9, on-demand update is also considered. Only the UE3 that needs to communicate with the UE1 can obtain the updated IP address of the UE1, so that a case in which each operation of the UE3 is additionally notified can be avoided.

The foregoing embodiment mainly describes a method for updating the IP address and the link identifier of the UE1. However, in some scenarios, if a link identifier between the UE1 and the relay is updated, but a link identifier between the relay and the UE3 is not changed, it is assumed that the link between the relay and the UE3 is dedicated for the UE1 to transmit data to the UE3. In this case, old and new identifiers between the UE1 and the relay, for example, the updated layer 2 identifier of the UE1, are associated by using the unchanged link identifier between the relay and the UE3. For example, in some message formats, an old data packet of the UE1 is: an old identifier of the UE1‖an identifier of the UE3; and after update, a new data packet of the UE1 is: a new identifier of the UE1‖the identifier of the UE3. In this case, an attacker may determine, based on the same identifier of the UE3, that the old identifier of the UE1 and the new identifier of the UE1 belong to the same UE1. This means that even if the link between the UE1 and the relay is updated, the attacker can still perform an association attack.

In this way, based on the foregoing embodiments, the route information update method provided in this embodiment of this application may further include a step of updating route information of the UE3 and a link identifier between the UE3 and the relay. This is applicable to a scenario in which a link between the relay and the UE3 is dedicated for the UE1 to transmit data to the UE3 (in other words, the link between the relay and the UE3 is a dedicated link), or applicable to a scenario in which a link between the relay and the UE3 is a shared link. A specific applicable scenario is not limited.

Figures 10, 11:
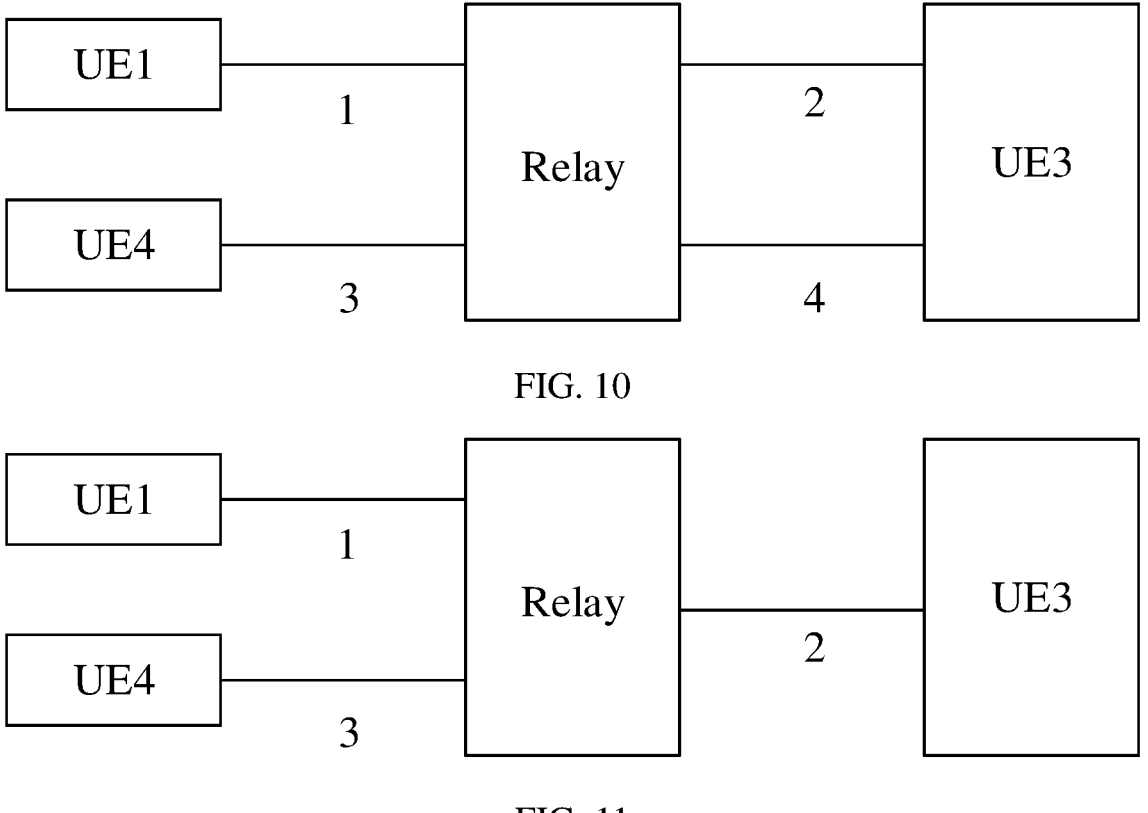
FIG. 10 is a schematic diagram of dedicated links.
FIG. 11 is a schematic diagram of a shared link.

For example, FIG. 10 is a schematic diagram of dedicated links. As shown in FIG. 10, a link between UE1 and a relay is 1, a link between UE4 and the relay is 3, and links between the relay and UE3 are 2 and 4. 1 and 2 are bound, and 3 and 4 are bound. In other words, 2 is dedicated to 1 and 4 is dedicated to 3. In this case, when the link 1 between the UE1 and the relay is updated, the link 2 also needs to be updated.

FIG. 11 is a schematic diagram of a shared link. As shown in FIG. 11, a link between UE1 and a relay is 1, a link between UE4 and the relay is 3, and a link between the relay and UE3 is 2. 2 may serve 1, or may serve 3. In other words, the link 2 between the relay and the UE3 is shared. In this case, when the link 1 between the UE1 and the relay is updated, the link 2 may be updated or may not be updated.

Figure 12A:
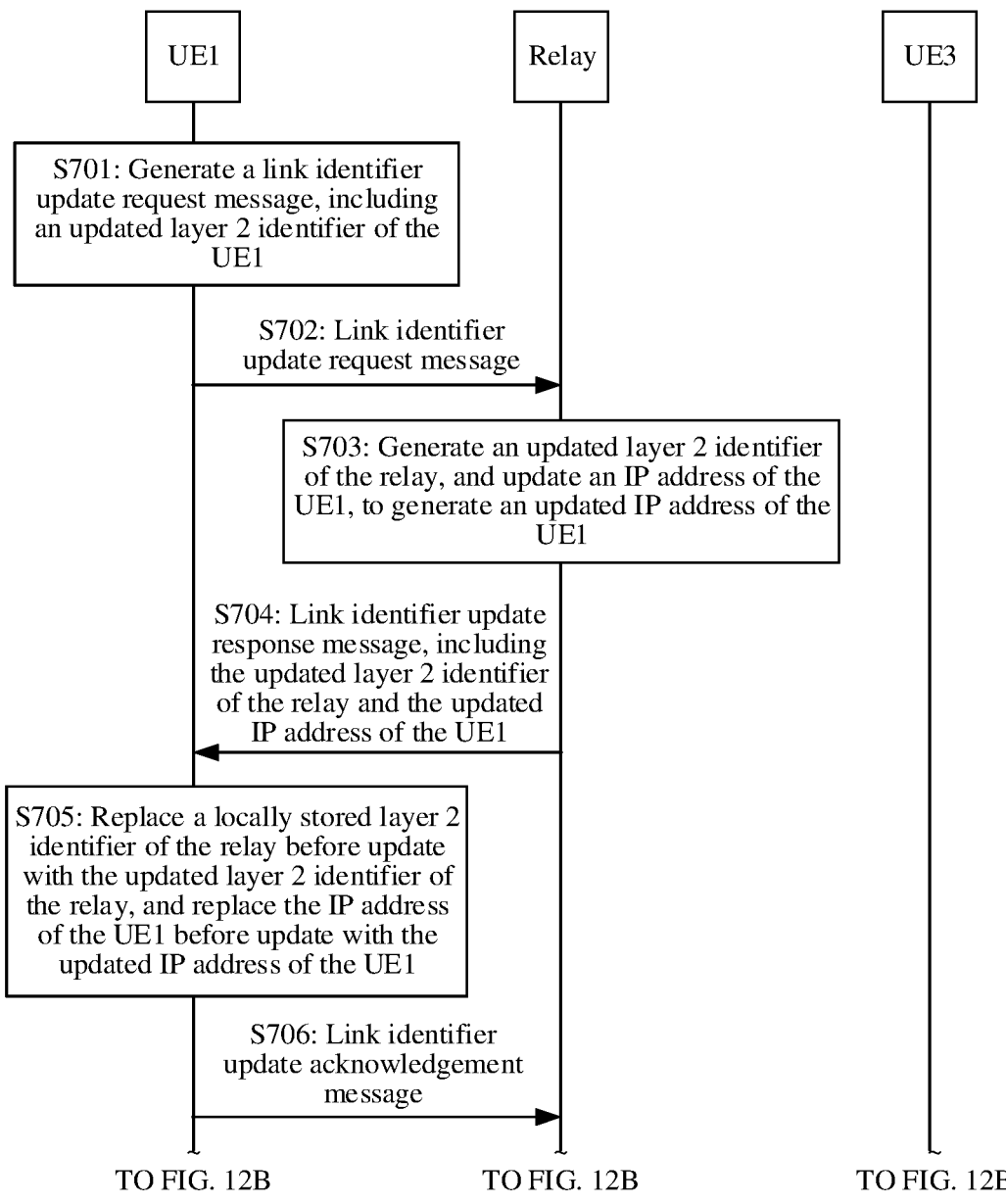
FIG. 12A and FIG. 12B is another schematic flowchart of a route information update method according to an embodiment of this application.
Figure 12B:
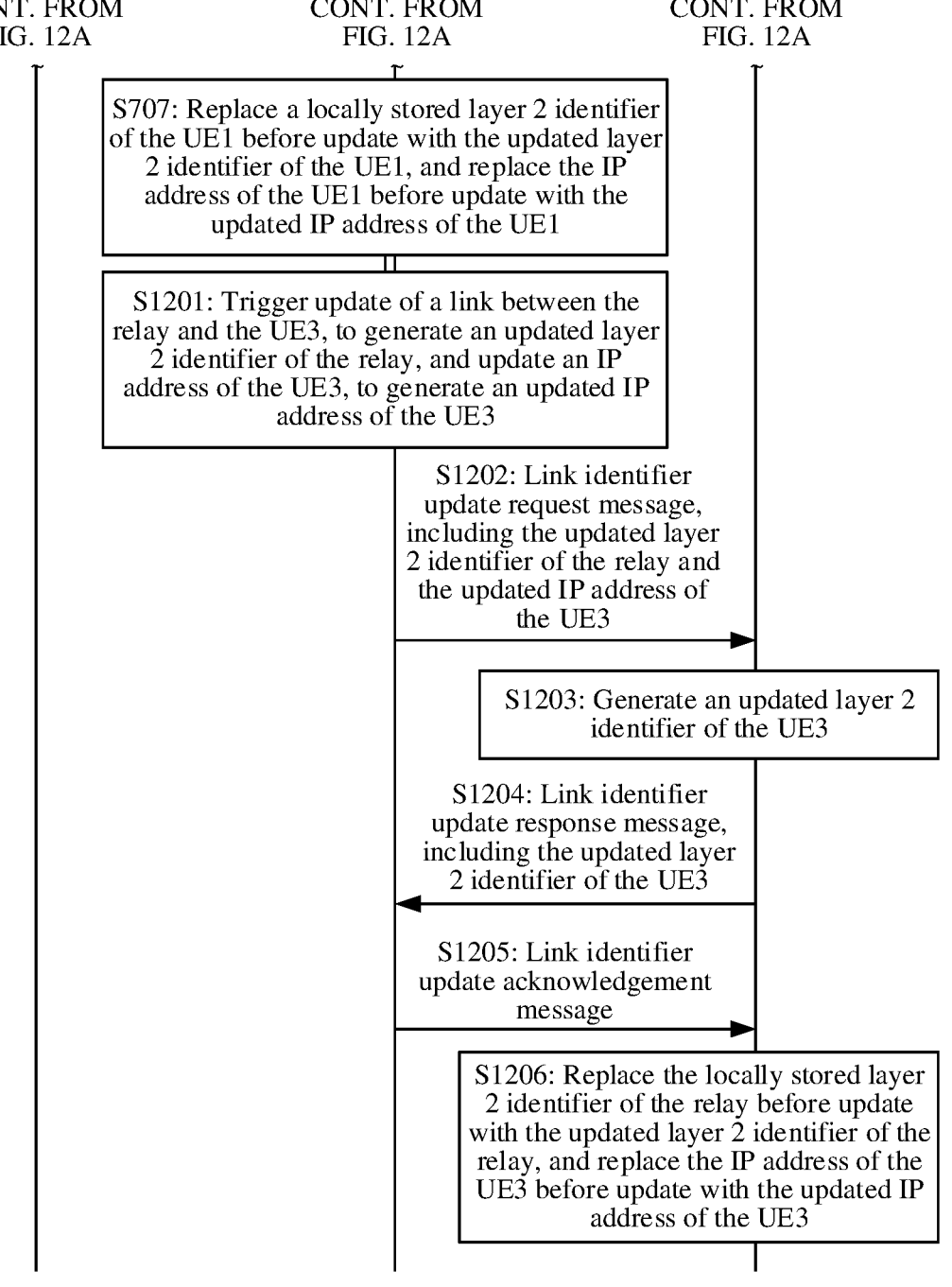

The following describes an example of steps of updating route information of UE3 and a link identifier between the UE3 and a relay with reference to FIG. 12A and FIG. 12B. FIG. 12A and FIG. 12B is another schematic flowchart of a route information update method according to an embodiment of this application. As shown in FIG. 12A and FIG. 12B, the route information update method may further include S1201 to S1206 based on any one of FIG. 7 to FIG. 9 (where FIG. 7 is used as an example). In the method, a process of updating an IP address of the UE3 may alternatively be implemented in a process of updating a link identifier between the UE3 and the relay.

S1201: The relay triggers update of a link between the relay and the UE3, to generate an updated layer 2 identifier of the relay (relay new layer 2 ID), and updates an IP address of the UE3, to generate an updated IP address of the UE3 (new UE3 IP).

The updated layer 2 identifier of the relay in S1201 may be the same as or different from the updated layer 2 identifier of the relay in the embodiment shown in FIG. 7. This is not limited.

Optionally, that the relay triggers update of a link between the relay and the UE3 may be: after determining, based on the first message or an update indication in the first message, or based on an ACK message sent by the UE1, that the UE1 has completed the update, the relay updates the link between the relay and the UE3.

Optionally, the relay may determine, based on whether the link between the relay and the UE3 is a dedicated link or a common link, whether to perform update. If the link is a dedicated link, the update procedure in S1201 is triggered. If the link is a common link, the update procedure in S1201 does not need to be triggered.

S1202: The relay sends a link identifier update request message to the UE3, where the link identifier update request message includes the updated layer 2 identifier of the relay and the updated IP address of the UE3.

Correspondingly, the UE3 receives the link identifier update request message. Notably, the link identifier update request message herein is different from the link identifier update request message sent by the UE1 to the relay in the foregoing embodiments.

S1203: The UE3 generates an updated layer 2 identifier of the UE3.

S1204: The UE3 sends a link identifier update response message to the relay, where the link identifier update response message includes the updated layer 2 identifier of the UE3.

Correspondingly, the relay receives the link identifier update response message. Notably, the link identifier update response message herein is different from the link identifier update response message sent by the relay to the UE1 in the foregoing embodiments.

Optionally, the relay replaces a locally stored layer 2 identifier of the UE3 before update with the updated layer 2 identifier of the UE3.

Herein, optionally, the link identifier update response message sent by the UE3 to the relay may further include an updated layer 2 identifier of the relay and/or an updated IP address of the UE3. After receiving the link identifier update response message, the relay may further determine whether the updated layer 2 identifier of the relay and/or the updated IP address of the UE3 that are/is included in the link identifier update response message are/is the same as the updated layer 2 identifier of the relay and/or the updated IP address of the UE3 that are/is sent by the UE3 in the link identifier update request message, to implement verification and ensure update accuracy. If the relay obtains, through verification, that the two updated layer 2 identifiers of the relay and/or the two updated IP addresses of the UE3 are different, the relay may send a reject message to the UE3, and does not perform the following steps. If the two updated layer 2 identifiers of the relay and/or the two updated IP addresses of the UE3 are same, the following steps are performed.

S1205: The relay sends a link identifier update acknowledgement message to the UE3.

Notably, the link identifier update acknowledgement message herein is different from the link identifier update acknowledgement message sent by the UE1 to the relay in the foregoing embodiments.

Herein, optionally, the link identifier update acknowledgement message sent by the relay to the UE3 may further include an updated layer 2 identifier of the UE3. After receiving the link identifier update acknowledgement message, the UE3 may further determine whether the updated layer 2 identifier of the UE3 included in the link identifier update acknowledgement message is the same as the updated layer 2 identifier that is of the UE3 and that is sent by the UE3 in the link identifier update response message, to implement verification and ensure update accuracy. If the UE3 obtains, through verification, that the two updated layer 2 identifiers of the UE3 are different, the UE3 may send a reject message to the relay, and does not perform the following steps. If the two updated layer 2 identifiers of the UE3 are same, the following steps are performed.

S1206: The UE3 replaces the locally stored layer 2 identifier of the relay before update with the updated layer 2 identifier of the relay, and replaces the IP address of the UE3 before update with the updated IP address of the UE3.

Optionally, S1206 may be performed at any other moment after S1202, and is not limited to S1205.

In the embodiment shown in FIG. 12A and FIG. 12B, the method may further include a step in which the relay notifies the UE1 of the updated IP address of the UE3, to notify the UE1 of the latest IP address of the UE3. This may be a step of triggering sending of the updated IP address to the UE1 after S1204. Optionally, after successfully verifying integrity protection in S1204, the relay sends the updated IP address of the UE3 to the UE1. The UE1 may replace the IP address of the UE3 before update with the updated IP address of the UE3. This step is similar to the step in which the relay notifies the UE3 of the updated IP address of the UE1 shown in FIG. 8 or FIG. 9, or the manner in which the UE1 transparently transmits the updated IP address of the UE1 to the UE3 via the relay. Details are not described herein again.

In addition, in the embodiment shown in FIG. 12A and FIG. 12B, processes of updating the IP address of the UE3 and the link identifier between the UE3 and the relay is triggered by updating the IP address of the UE1 and the link identifier between the UE1 and the relay. Based on such an understanding, the steps described in FIG. 12A and FIG. 12B are performed after the relay receives the link identifier update request message from the UE1, and are not specifically limited to being performed after a specific subsequent step, the foregoing figures are merely examples for description.

Similar to the manner of notifying the UE3 of the updated IP address of the UE1 in the foregoing embodiments, for the scenario shown in FIG. 12A and FIG. 12B, in a possible design, when communicating with a plurality of UE3s via the relay, the UE1 may send identification information of target UE3 to the relay, and the relay may send the link identifier update request message to the target UE3 based on the identification information of the target UE3. The target UE3 is UE3 in the plurality of UE3s that communicate with the UE1 via the relay. In other words, in S1202, UE3 to which the relay sends the updated IP address of the UE1 is determined based an indication from the UE1. The UE1 may send the identification information of the target UE3 to the relay for indication. For example, the UE1 may send identification information of the target UE3 to the relay by using the link identifier update request message. For details of the identification information of the target UE3, refer to the descriptions in the foregoing embodiments.

In this design, on-demand update is also considered. Only the UE3 that needs to communicate with the UE1 can obtain the updated IP address of the UE1, so that a case in which each operation of the UE3 is additionally notified can be avoided.

Alternatively, in another possible design, the relay may, based on a locally stored target UE3 that has historical communication with the UE1, send the link identifier update request message to the target UE3. Alternatively, in another possible design, for the dedicated links shown in FIG. 10, there is a mapping between the link between the relay and the UE3 and the link between the UE1 and the relay. In this case, the relay may determine the link between the UE1 and the relay based on an identifier (for example, the UE1 layer 2 ID or old UE1 IP) that identifies the link and that is in the link identifier update request message sent by the UE1, to determine the corresponding link between the relay and the UE3, and determine to send the link identifier update request message to the corresponding UE3.

Optionally, for the process shown in FIG. 12A and FIG. 12B, the relay may determine, based on a protection manner of a PC5 interface between the relay and the UE1, whether to perform the process. For example, if encryption protection is not enabled for data protection between the relay and the UE1, a subsequent update operation may be triggered according to the embodiment shown in FIG. 12A and FIG. 12B. If encryption protection is enabled, an attacker cannot see a parameter (for example, an IP address) of end-to-end data between the UE1 and the UE3 through the PC5 interface, and cannot associate an old identifier and a new identifier between the UE1 and the relay based on an exposed parameter between the UE1 and the UE3. In this case, the relay may not need to trigger a subsequent update operation. Certainly, if encryption protection is enabled, the relay may alternatively determine, according to another local policy, whether to trigger subsequent update. This is not limited herein.

FIG. 12A and FIG. 12B mainly describes how the relay triggers the update of the link between the relay and the UE3 when the link between the UE1 and the relay is updated. In some embodiments, the update of the link between the relay and the UE3 may alternatively be initiated by the UE3. For example, in the embodiment shown in FIG. 9, in the scenario in which the UE1 transparently transmits the updated IP address of the UE1 to the UE3 via the relay, the UE3 may actively initiate a link update trigger request message to the relay, to perform subsequent update.

Figure 13A:
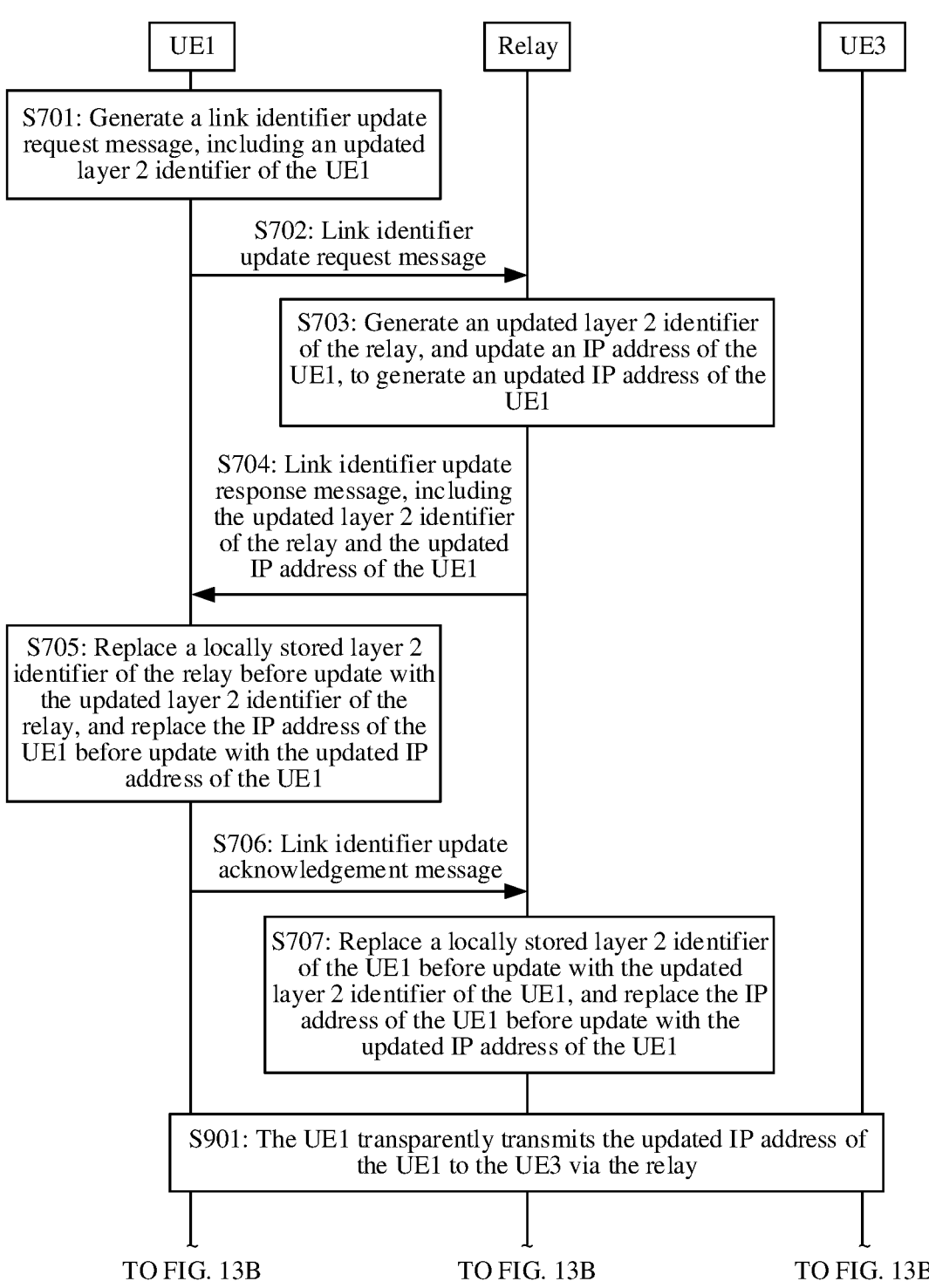

With reference to FIG. 13A and FIG. 13B, the following describes an example of a subsequent update process in which the UE3 may actively initiate a link update trigger request message, for example, referred to as a fourth message, to the relay. FIG. 13A and FIG. 13B is another schematic flowchart of a route information update method according to an embodiment of this application. As shown in FIG. 13A and FIG. 13B, the route information update method may further include S1301 to S1307 based on the method shown in FIG. 9.

S1301: The UE3 sends a fourth message to the relay, where the fourth message indicates the relay to update an IP address of the UE3.

Correspondingly, the relay receives the fourth message.

In this case, a link between the UE3 and the relay is triggered to be updated. For a process of triggering the update herein, refer to the foregoing actions triggered by the relay.

S1302: The relay generates an updated layer 2 identifier of the relay, and updates the IP address of the UE3, to generate an updated IP address of the UE3.

S1303: The relay sends a link identifier update request message to the UE3, where the link identifier update request message includes the updated layer 2 identifier of the relay and the updated IP address of the UE3.

S1304: The UE3 generates an updated layer 2 identifier of the UE3.

S1305: The UE3 sends a link identifier update response message to the relay, where the link identifier update response message includes the updated layer 2 identifier of the UE3.

The relay replaces a locally stored layer 2 identifier of the UE3 before update with the updated layer 2 identifier of the UE3.

S1306: The relay sends a link identifier update acknowledgement message to the UE3.

S1307: The UE3 replaces the locally stored layer 2 identifier of the relay before update with the updated layer 2 identifier of the relay, and replaces the IP address of the UE3 before update with the updated IP address of the UE3.

S1302 to S1307 are the same as S1201 to S1206, and details are not described herein again.

Alternatively, the UE3 may directly generate an updated layer 2 identifier of the UE3, and send the updated layer 2 identifier of the UE3 to the relay in S1301, to trigger update. The steps are similar to S701 to S706. In this case, the UE3 directly triggers update.

In the embodiment shown in FIG. 13A and FIG. 13B, a step of notifying the UE1 of the updated IP address of the UE3 is also included, to notify the UE1 of the latest IP address of the UE3. Herein, the UE3 may notify the UE1, or the relay may notify the UE1. This is not limited. The UE1 may replace the IP address of the UE3 before update with the updated IP address of the UE3. This step is also similar to the step in which the relay notifies the updated IP address of the UE1 to the UE3 shown in FIG. 8 or FIG. 9, or the manner in which the UE1 transparently transmits the updated IP address of the UE1 to the UE3 via the relay. Details are not described herein again.

Optionally, in the scenario shown in FIG. 1, to be specific, in the scenario in which the UE1 communicates with the network device, for example, the gNB, via the relay, the route information method further includes a step of updating identification information of an air interface that provides data transmission for the UE1 based on the method shown in FIG. 7. For example, when there is an end-to-end protection mechanism between the UE1 and the gNB, an end-to-end parameter that may be used to identify the UE1 and that is between the UE1 and the gNB needs to be updated.

Figure 14A:
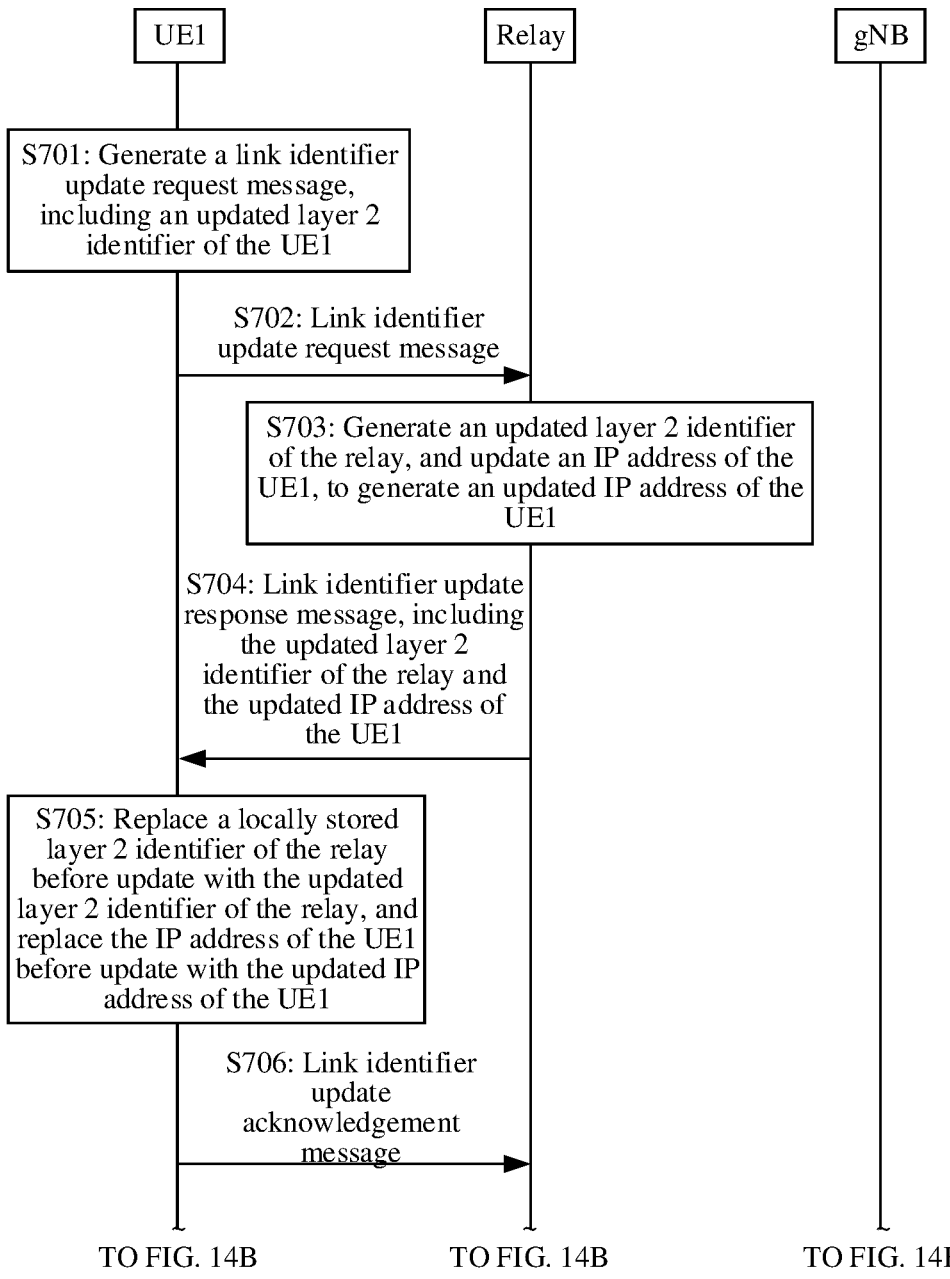

For example, FIG. 14A and FIG. 14B is another schematic flowchart of a route information update method according to an embodiment of this application. As shown in FIG. 14A and FIG. 14B, the route information update method may further include S1401 to S1403 based on the method shown in FIG. 7.

S1401: The relay sends a first radio resource control (radio resource control, RRC) message to a gNB, where the first RRC message includes identification information of an air interface that provides data transmission for the UE1, and the first RRC message indicates the gNB to update the identification information.

Correspondingly, the gNB receives the first RRC message.

Optionally, the relay may determine, based on a UE1 IP or a UE1 layer 2 ID sent by the UE1, the air interface (which is also referred to as a radio bearer) that provides data transmission for the UE1, to generate the first RRC message.

Herein, the first RRC message is a message sent after the relay updates the IP address of the UE1. In other words, the steps shown in FIG. 14A and FIG. 14B are performed after the steps shown in FIG. 7. It may be understood as that after determining that the UE1 successfully updates the IP address of the UE1, the relay triggers update of S1401.

Optionally, the first RRC message may further carry an update indication that indicates the gNB to update the identification information of the air interface that provides data transmission for the first terminal. Alternatively, the first RRC message may be another special message type that can indicate the gNB to update the identification information of the air interface that provides data transmission for the first terminal. This is not limited herein.

S1402: The gNB updates, based on the first RRC message, the identification information of the air interface that provides data transmission for the first terminal, to generate updated identification information.

Optionally, the gNB may determine, based on the update indication or a message type carried in the first RRC message, to update the identification information of the air interface.

Optionally, the updated identification information may include: a new cell radio network identifier (cell radio network temporary identifier, C-RNTI), a new RRC Counter, a new air interface (or bearer) identifier, a new spectrum identifier, a new packet data convergence protocol (packet data convergence protocol, PDCP) sequence number (sequence number, SQN) or counter (which may start from 0 or be randomly selected), another new ID identifying the air interface identifier, and the like. This is not limited herein.

S1403: The gNB sends a second RRC message to the relay, where the second RRC message includes the updated identification information.

Correspondingly, the relay receives the second RRC message.

Optionally, the second RRC message may also be referred to as an RRC reconfiguration message.

Subsequently, the relay may select, based on the updated identification information, a corresponding air interface that provides data transmission for the first terminal, and transmit data of the UE1 to the gNB.

Certainly, before this, the relay replaces the locally stored identification information of the air interface before update that provides data transmission for the first terminal with the updated identification information. Details are not described herein again. Then, the relay may further return a response message or an acknowledgement message to the gNB, to notify the gNB that the relay has completed the replacement.

In some embodiments, the relay may further send the updated identification information included in the second RRC message to the UE1, and the UE1 may refresh a parameter between the UE1 and the gNB based on the updated identification information. For example, a new PDCP SQN or counter is used to replace the existing PDCP SQN or counter, or a new bearer identifier is used to replace the old bearer identifier. Other replacement operations are not described herein again. The bearer identifier herein may be a parameter used to perform PDCP layer protection.

In the embodiment shown in FIG. 14A and FIG. 14B, update of an air interface Uu radio identifier can be triggered, to avoid a case in which an attacker may associate an old identifier and a new identifier between UE and a relay based on an existing radio bearer identifier between the relay and a network device.

Optionally, for the process shown in FIG. 14A and FIG. 14B, the relay may determine, based on a protection manner of a PC5 interface between the relay and the UE1, whether to perform the process. For example, if encryption protection is not enabled for data protection between the relay and the UE1, a subsequent update operation may be triggered according to the embodiment shown in FIG. 14A and FIG. 14B. If encryption protection is enabled, an attacker cannot see a parameter (for example, a PDCP SQN or counter, or an air interface identifier) of end-to-end data between the UE1 and the gNB through the PC5 interface, and cannot associate an old identifier and a new identifier between the UE1 and the relay based on an exposed parameter between the UE1 and the gNB. In this case, the relay may not need to trigger a subsequent update operation. Certainly, if encryption protection is enabled, the relay may alternatively determine, according to another local policy, whether to trigger subsequent update. This is not limited herein.

In another possibility, if protection to be performed is an end-to-end protection mechanism between the UE and the gNB (where PDCP protection is used as an example for description), an updated parameter used for end-to-end protection needs to be notified to the UE1 (where the PDCP is used as an example, and the parameter may be a bearer identifier herein).

Therefore, in another possibility, a relay side triggers the update procedure. In other words, steps S701 to S707 are not included. For that the relay directly triggers air interface update, refer to the content in S1401. The relay triggers the air interface identifier update according to a local policy and the like, sends a bearer identifier before update to the gNB, and obtains an updated bearer identifier from the gNB (where, optionally, an RRC reconfiguration message may be used). In this case, the relay needs to determine a corresponding UE1 based on the bearer identifier before update, and send the updated bearer identifier to the UE1. It may be understood that when the UE1 uses a relay function, the relay transmits data of the UE1 to a base station by using an air interface bearer corresponding to the bearer identifier after the data is sent to the relay. Therefore, the relay needs to send the updated bearer identifier to the UE1. In this case, the UE1 and the gNB can share the updated bearer identifier. Then, the UE1 and the gNB perform end-to-end PDCP layer protection between the UE1 and the gNB by using the updated bearer identifier.

In another possibility, a gNB side triggers the update procedure. In other words, steps S701 to S707 and S1401 are not included. The gNB directly triggers air interface update, and the gNB triggers the air interface identifier update according to a local policy and the like, and sends an updated bearer identifier to the relay (where, optionally, an RRC reconfiguration message may be used, or optionally, a bearer identifier before update may be sent). In this case, the relay receives the updated bearer identifier (optionally, the bearer identifier before update may further be included). The relay may determine the bearer identifier before update based on the updated bearer identifier (for example, when there is only one bearer, or determine the bearer identifier before update based on another parameter (for example, a session identifier is not limited)). Alternatively, the relay determines a corresponding UE1 based on the received bearer identifier before update, and sends the updated bearer identifier to the UE1. In this case, the UE1 and the gNB can share the updated bearer identifier. Then, the UE1 and the gNB perform end-to-end PDCP layer protection between the UE1 and the gNB by using the updated bearer identifier.

In another possibility, a bearer identifier update procedure is triggered when the gNB is handed over. In other words, steps S701 to S707 and S1401 are not included. A source gNB triggers, according to a local policy, a handover between gNBs, to hand over from the source gNB to a target gNB, and receives an updated bearer identifier from the target gNB. The source gNB sends the updated bearer identifier to the relay (where, optionally, an RRC reconfiguration message may be used, or optionally, a bearer identifier before update may be sent). In this case, the relay receives the updated bearer identifier (optionally, the bearer identifier before update may further be included). The relay may determine the bearer identifier before update based on the updated bearer identifier (for example, when there is only one bearer, or determine the bearer identifier before update based on another parameter (for example, a session identifier is not limited)). Alternatively, the relay determines a corresponding UE1 based on the received bearer identifier before update, and sends the updated bearer identifier to the UE1. In this case, the UE1 and the gNB can share the updated bearer identifier. Then, the UE1 and the gNB perform end-to-end PDCP layer protection between the UE1 and the gNB by using the updated bearer identifier.

Further notably, content related to the layer 2 identifier in the foregoing embodiments of this application may be optional content. To be specific, the foregoing generation, sending, and verification processes may include only processing of route information.

In addition, optionally, integrity protection is performed on each message in the foregoing embodiments of this application. Before sending a message, a sender (for example, the UE1) performs integrity protection by using a key shared with a receiver (for example, the relay). After receiving the message, the receiver performs integrity protection verification by using the key shared with the sender. A subsequent operation is performed only after the verification is passed. If the verification fails, a rejection message is sent to the sender. An exception is that, in FIG. 13A and FIG. 13B, when the UE1 sends a message in S901 to the UE3 via the relay, in this case, content in S901 is directly sent to the UE3. Therefore, logically, the sender and the receiver are the UE1 and the UE3. In this case, a protection key in S901 is shared between the UE1 and the UE3.

Further notably, in the foregoing embodiments of this application, IP address update is merely an example for description. The route information update method provided in embodiments of this application is also applicable to update of another identifier that can be used for routing, for example, a layer 2 identifier (layer 2 ID) route or another non-IP route, for example, MAC information or a private network address. In addition, in addition to the foregoing route information, in embodiments of this application, another new identifier of UE that may be leaked, for example, an application identifier of the UE, is also updated. This part is described in an optional manner in the foregoing embodiments. Details are not described herein again.

The foregoing mainly describes the solutions provided in embodiments of this application from a perspective of interaction between network elements. It may be understood that, to implement the foregoing functions, a first terminal (for example, UE1), a second terminal (for example, UE2), a third terminal (for example, UE3), a network device (for example, a gNB), and the like include corresponding hardware structures and/or software module for performing functions.

Figure 15:
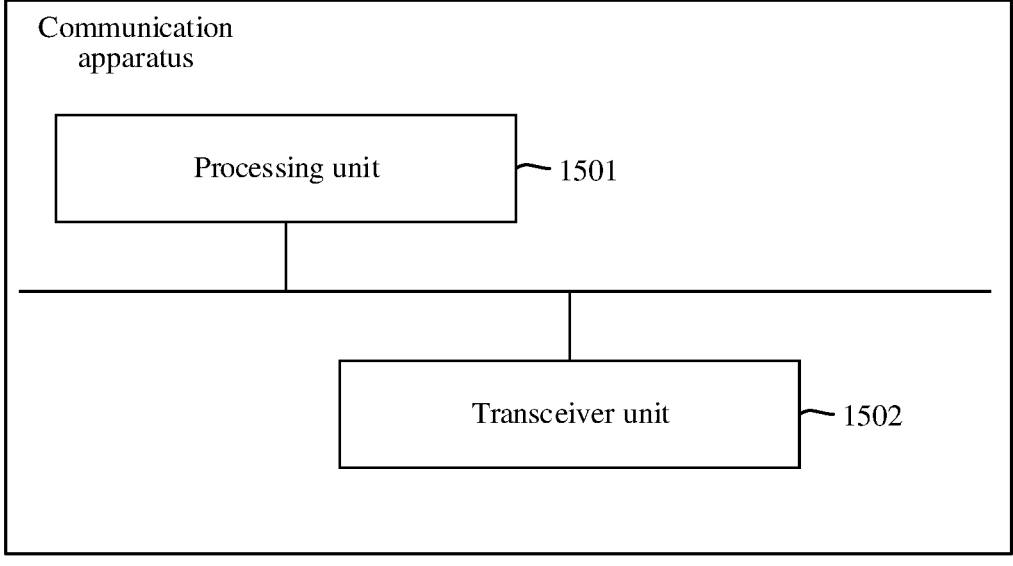
FIG. 15 is a schematic diagram of a structure of a communication apparatus according to an embodiment of this application.

For example, an embodiment of this application may further provide a communication apparatus that can be used in the first terminal. FIG. 15 is a schematic diagram of a structure of a communication apparatus according to an embodiment of this application. As shown in FIG. 15, the communication apparatus includes a processing unit 1501 and a transceiver unit 1502. The processing unit 1501 and the transceiver unit 1502 are configured to implement the steps performed by the first terminal in the foregoing embodiments. For example, the transceiver unit 1502 is configured to implement sending functions such as S401, S405, S702, S706, and S901 of the first terminal, and other receiving functions that are not reflected in the steps. The processing unit 1501 is configured to implement data processing functions such as S404, S701, and S705 of the first terminal.

Notably, all functions of the first terminal in the foregoing embodiments are not listed herein one by one. However, it can be understood that both sending and receiving functions of the first terminal in the foregoing embodiments may be implemented by using the transceiver unit 1502. The data processing functions of the first terminal, for example, generating an updated layer 2 identifier of the first terminal and performing an IP address replacement operation, may be implemented by using the processing unit 1501. Details are not described herein again.

Figure 16:
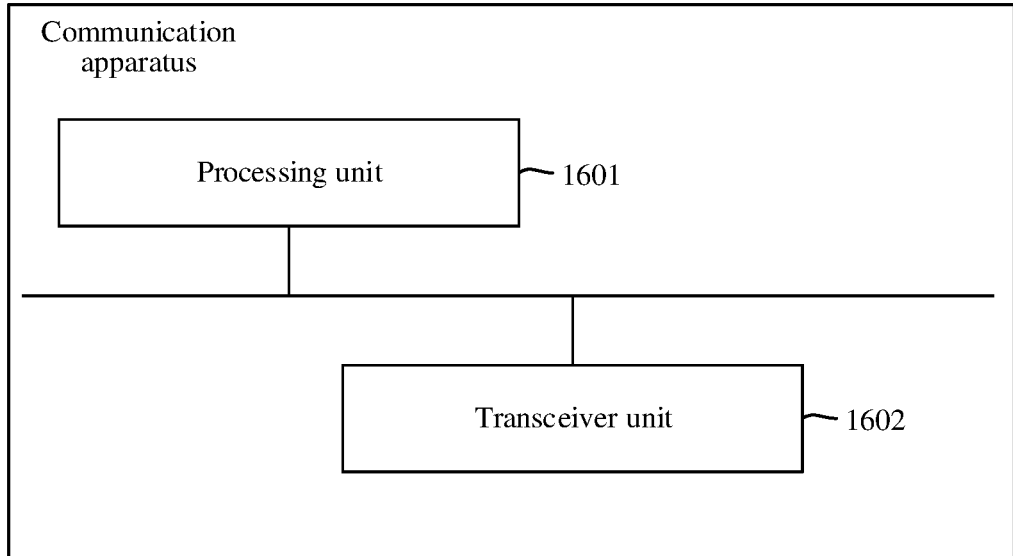
FIG. 16 is a schematic diagram of another structure of a communication apparatus according to an embodiment of this application.

Similarly, an embodiment of this application may further provide a communication apparatus used in a second terminal. FIG. 16 is a schematic diagram of another structure of a communication apparatus according to an embodiment of this application. As shown in FIG. 16, the communication apparatus includes a processing unit 1601 and a transceiver unit 1602. The processing unit 1601 and the transceiver unit 1602 are configured to implement the steps performed by the second terminal in the foregoing embodiments. For example, the transceiver unit 1602 is configured to implement sending functions such as S403, S405, S704, S801, S1202, S1205, S1303, S1306 and S1401 of the second terminal, and other receiving functions that are not reflected in the steps. The processing unit 1601 is configured to implement data processing functions such as S402, S406, S703, S707, S1201 and S1302 of the second terminal.

Likewise, all functions of the second terminal in the foregoing embodiments are not listed herein one by one. It can be understood that both sending and receiving functions of the second terminal in the foregoing embodiments may be implemented by using the transceiver unit 1602. The data processing functions of the second terminal, for example, generating an updated layer 2 identifier of the second terminal and performing an IP address replacement operation, may be implemented by using the processing unit 1601. Details are not described herein again.

Figure 17:
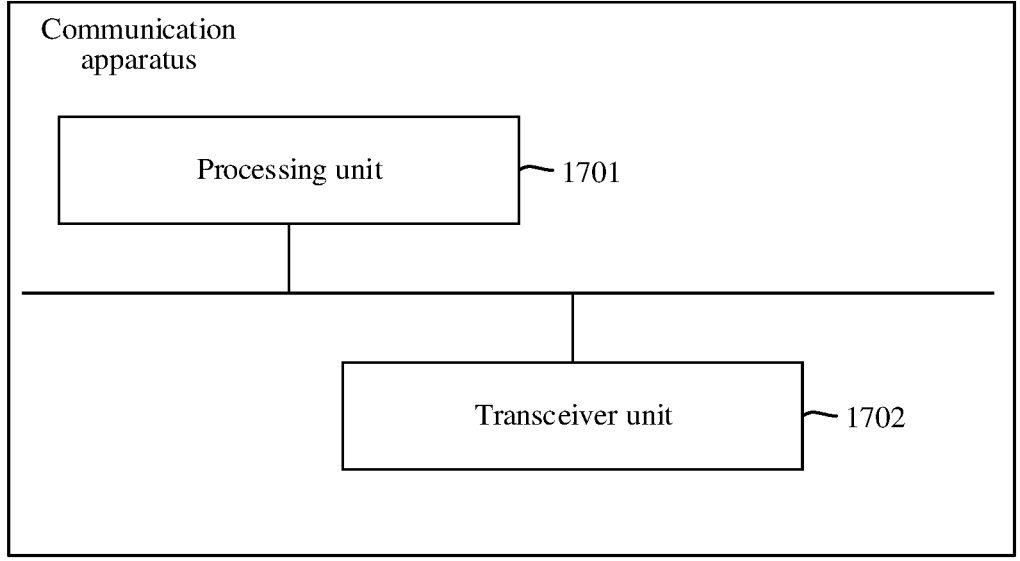
FIG. 17 is a schematic diagram of another structure of a communication apparatus according to an embodiment of this application.

Similarly, an embodiment of this application may further provide a communication apparatus used in a first device. FIG. 17 is a schematic diagram of another structure of a communication apparatus according to an embodiment of this application. As shown in FIG. 17, the communication apparatus includes a processing unit 1701 and a transceiver unit 1702.

When the first device is the foregoing third terminal (for example, UE3), the processing unit 1701 and the transceiver unit 1702 are configured to implement the steps performed by the third terminal in the foregoing embodiments. For example, the transceiver unit 1702 is configured to implement sending functions such as S1204, S1301, and S1305 of the third terminal, and other receiving functions that are not reflected in the steps. The processing unit 1701 is configured to implement data processing functions such as S902, S1203, S1206, S1304, and S1307 of the third terminal.

When the first device is the foregoing network device (for example, a gNB), the processing unit 1701 and the transceiver unit 1702 are configured to implement the steps performed by the network device in the foregoing embodiments. For example, the transceiver unit 1702 is configured to implement a sending function such as S1403 of the network device and a receiving function that is not reflected in the steps. The processing unit 1701 is configured to implement a data processing function such as S1402 of the network device.

Notably, all functions of the first device in the foregoing embodiments are also not listed herein one by one. However, it can be understood that both sending and receiving functions of the first device in the foregoing embodiments may be implemented by using the transceiver unit 1702. All data processing functions of the first device may be implemented by using the processing unit 1701. Details are not described herein again.

It can be understood that division into units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units are implemented in a form of hardware.

For example, each unit may be a separately disposed processing element, or may be integrated into a chip of the apparatus for implementation. In addition, each unit may alternatively be stored in a memory in a form of a program invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, any one of the foregoing units in the apparatus may be one or more integrated circuits configured to implement the foregoing methods, for example, one or more ASICs, one or more DSPs, one or more FPGAs, or a combination of at least two of the integrated circuit forms.

For another example, when the foregoing units in the apparatus may be implemented in a form of a program invoked by a processing element, the processing element may be a general-purpose processor, for example, a CPU or another processor that can invoke the program. For another example, the units may be integrated and implemented in a form of a system-on-a-chip (system-on-a-chip, SOC).

The foregoing unit for receiving is an interface circuit or an input circuit of the apparatus, and is configured to receive a signal from another apparatus. For example, when the apparatus is implemented by using a chip, the receiving unit is an interface circuit or an input circuit used by the chip to receive a signal from another chip or apparatus. When the communication apparatus includes a unit for sending, the unit for sending is an interface circuit or an output circuit of the apparatus, and is configured to send a signal to another apparatus. For example, when the apparatus is implemented by using a chip, the sending unit is an interface circuit or an output circuit used by the chip to send a signal to another chip or apparatus.

For example, an embodiment of this application may further provide a communication apparatus used in any one of a first terminal, a second terminal, and a first device. The communication apparatus may include a processor and an interface circuit. There may be one or more processors.

When the communication apparatus is used in the first terminal, the second terminal, or the first device, the processor is configured to communicate with another apparatus through the interface circuit, and perform the steps correspondingly performed by the first terminal, the second terminal, or the first device in the foregoing methods.

In an implementation, the units that respectively implement the corresponding steps in the foregoing methods in the first terminal, the second terminal, or the first device may be implemented in a form of a program scheduled by a processing element. For example, an apparatus used for the first terminal, the second terminal, or the first device may include a processing element and a storage element. The processing element invokes a program stored in the storage element, to perform the corresponding methods performed by the first terminal, the second terminal, or the first device in the foregoing method embodiments. The storage element may be a storage element whose processing element is located on a same chip, that is, an on-chip storage element.

In another implementation, a program used to perform the methods performed by the first terminal, the second terminal, or the first device in the foregoing methods may be in a storage element located on a different chip from the processing element, that is, an off-chip storage element. In this case, the processing element invokes or loads the program from the off-chip storage element on the on-chip storage element, to invoke and perform the corresponding methods performed by the first terminal, the second terminal, or the first device in the foregoing method embodiments.

For example, an embodiment of this application may further provide a communication apparatus. The communication apparatus may include a processor, configured to execute computer instructions stored in a memory. When the computer instructions are executed, the apparatus is enabled to perform the foregoing methods performed by the first terminal, the second terminal, or the first device. The memory may be located inside the communication apparatus, or may be located outside the communication apparatus. There are one or more processors.

In another implementation, the units that implement the steps in the foregoing methods in the first terminal, the second terminal, or the first device may be configured as one or more processing elements. These processing elements may be disposed on the corresponding first terminal, second terminal, or first device. The processing element herein may be an integrated circuit, for example, one or more ASICs, one or more DSPs, one or more FPGAs, or a combination of these types of integrated circuits. These integrated circuits may be integrated together to form a chip.

The units that implement the steps in the foregoing methods in the first terminal, the second terminal, or the first device may be integrated together, and implemented in a form of an SOC. An SOC chip is configured to implement a corresponding method. At least one processing element and storage element may be integrated into the chip, and the processing element invokes a program stored in the storage element to implement the corresponding method. Alternatively, at least one integrated circuit may be integrated into the chip, to implement the corresponding method. Alternatively, with reference to the foregoing implementations, functions of some units may be implemented by the program invoked by the processing element, and functions of some units may be implemented by the integrated circuit.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

For example, an embodiment of this application further provides a chip system. The chip system may be used in any one of the first terminal, the second terminal, or the first device. The chip system includes one or more interface circuits and one or more processors. The interface circuit and the processor are interconnected through a cable. The processor receives and executes computer instructions from a memory of an electronic device through the interface circuit, to implement the method performed by the first terminal, the second terminal, or the first device in the foregoing method embodiments.

Based on the descriptions of the foregoing implementations, a person skilled in the art can clearly understand that, for ease and brevity of description, division into the foregoing functional modules is merely used as an example for illustration. During actual application, the foregoing functions may be allocated to different functional modules and implemented as required. In other words, an inner structure of the apparatus is divided into different functional modules to implement all or some of the functions described above.

In the several embodiments provided in this application, it can be understood that the disclosed apparatuses and methods may be implemented in other manners. For example, the described apparatus embodiments are merely examples. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication links may be implemented through some interfaces. The indirect couplings or communication links between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium, including computer software instructions. When the computer software instructions are run in an electronic device or a chip built in the electronic device, the electronic device is enabled to perform the method performed by the first terminal, the second terminal, or the first device in the foregoing embodiments.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A route information update method performed at a second terminal, wherein the method comprises:
   generating route information of a first terminal, wherein
   a relay function of the second terminal provides a communication service for the first terminal and a first device based on the route information of the first terminal, and
   the first device comprises at least one of a third terminal or a network device;
   updating the route information of the first terminal to generate updated route information of the first terminal;
   sending a second message to the first terminal, wherein the second message comprises the updated route information of the first terminal;
   responsive to the first device comprising the third terminal, sending the updated route information of the first terminal to the third terminal; and
   responsive to the first device comprising the network device, sending the updated route information of the first terminal to the network device.

2. The method according to claim 1, wherein
   before the updating the route information of the first terminal, the method further comprises:

receiving a first message from the first terminal, wherein the first message indicates the second terminal to update the route information of the first terminal;

the updating the route information of the first terminal comprises:

updating the route information of the first terminal based on the first message;

the first message is a link identifier update request message, and the second message is a link identifier update response message;

the first message comprises an updated layer 2 identifier of the first terminal;

the method further comprises:

updating a layer 2 identifier of the second terminal, to generate an updated layer 2 identifier of the second terminal; and the second message further comprises the updated layer 2 identifier of the second terminal.

3. The method according to claim 1, wherein before the updating the route information of the first terminal, the method further comprises:

receiving a first message from the first terminal, wherein the first message indicates the second terminal to update the route information of the first terminal;

the updating the route information of the first terminal comprises:

updating the route information of the first terminal based on the first message;

the route information of the first terminal comprises:

first route information of the first terminal to directly communicate with the second terminal, and second route information of the first terminal to use the relay function of the second terminal;

the first message comprises an update indication, wherein the update indication indicates the second terminal to update the second route information to generate updated second route information; and the updated route information of the first terminal comprises the updated second route information.

4. The method according to claim 1, wherein before the updating the route information of the first terminal, the method further comprises:

receiving a first message from the first terminal, wherein the first message indicates the second terminal to update the route information of the first terminal;

the updating the route information of the first terminal comprises:

updating the route information of the first terminal based on the first message;

the method further comprises:

generating updated route information of the second terminal based on the first message; and the second message further comprises the updated route information of the second terminal.

5. The method according to claim 1, wherein before the updating the route information of the first terminal, the method further comprises:

receiving a first message from the first terminal, wherein the first message indicates the second terminal to update the route information of the first terminal;

the updating the route information of the first terminal comprises:

updating the route information of the first terminal based on the first message;

the first message further comprises identification information of a fourth terminal, and the fourth terminal comprises the third terminal; and the method further comprises:

sending the updated route information of the first terminal to the fourth terminal based on the identification information of the fourth terminal.

6. The method according to claim 1, wherein before the updating the route information of the first terminal, the method further comprises:

receiving a first message from the first terminal, wherein the first message indicates the second terminal to update the route information of the first terminal;

the updating the route information of the first terminal comprises:

updating the route information of the first terminal based on the first message;

the method further comprises:

updating route information of the third terminal, to generate updated route information of the third terminal; and sending the updated route information of the third terminal to the third terminal and the first terminal.

7. The method according to claim 6, wherein the updating the route information of the third terminal comprises:

updating the route information of the third terminal in response to receiving the first message from the first terminal.

8. The method according to claim 1, wherein responsive to the first device comprising the network device, the method further comprises:

sending a first radio resource control (RRC) message to the network device, wherein the first RRC message comprises identification information of an air interface that provides data transmission for the first terminal, and the first RRC message indicates the network device to update the identification information of the air interface; and receiving a second RRC message from the network device, wherein the second RRC message comprises updated identification information of the air interface.

9. A route information update method performed at a first terminal, wherein the method comprises:

generating a first message, wherein the first message indicates a second terminal to update route information of the first terminal, the first terminal communicates with a first device based on the route information of the first terminal using a relay function of the second terminal, and the first device comprises at least one of a third terminal or a network device;

sending the first message to the second terminal;

receiving a second message from the second terminal, wherein the second message comprises updated route information of the first terminal; and replacing the route information of the first terminal before update with the updated route information of the first terminal, wherein the route information of the first terminal comprises:

first route information of the first terminal to directly communicate with the second terminal, and second route information of the first terminal to use the relay function of the second terminal;

the first message comprises an update indication, wherein the update indication indicates the second terminal to update the second route information to generate updated second route information; and the updated route information of the first terminal comprises the updated second route information.

10. The method according to claim 9, wherein the first message is a link identifier update request message, and the second message is a link identifier update response message;

before the generating the first message, the method further comprises:

updating a layer 2 identifier of the first terminal, to generate an updated layer 2 identifier of the first terminal;

the first message comprises the updated layer 2 identifier of the first terminal; and the second message further comprises an updated layer 2 identifier of the second terminal.

11. The method according to claim 9, wherein the second message further comprises updated route information of the second terminal.

12. The method according to claim 9, wherein the first message further comprises identification information of a fourth terminal, and the fourth terminal comprises the third terminal.

13. The method according to claim 9, wherein the method further comprises:

sending the updated route information of the first terminal to a fourth terminal via the second terminal, wherein the fourth terminal comprises the third terminal.

14. The method according to claim 9, wherein the method further comprises:

receiving updated route information of the third terminal from the second terminal.

15. A communication apparatus, comprising:

at least one processor; and one or more memories coupled to the at least one processor and storing programming instructions executable by the at least one processor to cause the communication apparatus to:

generate route information of a first terminal, wherein the communication apparatus comprises a relay function configured to provide a communication service for the first terminal and a first device based on the route information of the first terminal, and the first device comprises at least one of a third terminal or a network device;

update the route information of the first terminal to generate updated route information of the first terminal;

send a second message to the first terminal, wherein the second message comprises the updated route information of the first terminal;

responsive to the first device comprising the third terminal, send the updated route information of the first terminal to the third terminal, and responsive to the first device comprising the network device, send a first radio resource control (RRC) message to the network device, wherein the first RRC message comprises identification information of an air interface that provides data transmission for the first terminal, and the first RRC message indicates the network device to update the identification information of the air interface; and receive a second RRC message from the network device, wherein the second RRC message comprises updated identification information of the air interface.

16. A communication apparatus, comprising:

at least one processor; and one or more memories coupled to the at least one processor and storing programming instructions executable by the at least one processor to cause the communication apparatus to:

generate a first message, wherein the first message indicates a second terminal to update route information of the communication apparatus, the communication apparatus is configured to communicate with a first device based on the route information of the communication apparatus using a relay function of the second terminal, and the first device comprises at least one of a third terminal or a network device;

send the first message to the second terminal;

receive a second message from the second terminal, wherein the second message comprises updated route information of the communication apparatus; and replace the route information of the communication apparatus before update with the updated route information of the communication apparatus, wherein the route information of the communication apparatus comprises:

first route information of the communication apparatus to directly communicate with the second terminal, and second route information of the communication apparatus to use the relay function of the second terminal;

the first message comprises an update indication, wherein the update indication indicates the second terminal to update the second route information to generate updated second route information; and the updated route information of the communication apparatus comprises the updated second route information.

* * * * *